(12) United States Patent
Nose et al.

(10) Patent No.: US 11,807,216 B2
(45) Date of Patent: Nov. 7, 2023

(54) CONTROLLER FOR HYBRID ELECTRIC VEHICLE AND CONTROL METHOD FOR HYBRID ELECTRIC VEHICLE

(71) Applicant: TOYOTA JIDOSHA KABUSHIKI KAISHA, Aichi-ken (JP)

(72) Inventors: Yuki Nose, Nagoya (JP); Yuto Ikeda, Okazaki (JP); Suguru Kumazawa, Nisshin (JP); Takanobu Gotoh, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/674,758

(22) Filed: Feb. 17, 2022

(65) Prior Publication Data

US 2022/0266814 A1 Aug. 25, 2022

(30) Foreign Application Priority Data

Feb. 24, 2021 (JP) .................................. 2021-027699

(51) Int. Cl.
*B60W 20/15* (2016.01)
*B60W 10/06* (2006.01)
*B60W 10/08* (2006.01)
*F02D 41/00* (2006.01)

(52) U.S. Cl.
CPC ............ *B60W 20/15* (2016.01); *B60W 10/06* (2013.01); *B60W 10/08* (2013.01); *F02D 41/0087* (2013.01); *B60W 2710/083* (2013.01)

(58) Field of Classification Search
CPC .... B60W 10/06; B60W 10/08; F02D 41/0087

USPC .......................................................... 701/22
See application file for complete search history.

(56) References Cited

U.S. PATENT DOCUMENTS

| 5,722,359 | A | * | 3/1998 | Chubachi | F02D 35/023 903/905 |
| 6,336,070 | B1 | * | 1/2002 | Lorenz | B60W 20/00 701/110 |
| 6,405,701 | B1 | * | 6/2002 | Masberg | B60W 20/00 123/192.1 |
| 7,121,975 | B2 | * | 10/2006 | Tomura | B60W 10/08 290/40 R |

(Continued)

FOREIGN PATENT DOCUMENTS

| EP | 1388450 A2 | 2/2004 |
| JP | 2009248698 A | 10/2009 |

(Continued)

*Primary Examiner* — Sizo B Vilakazi
*Assistant Examiner* — Brian R Kirby
(74) *Attorney, Agent, or Firm* — HAUPTMAN HAM, LLP

(57) ABSTRACT

A controller and a control method for a hybrid electric vehicle are provided. An internal combustion engine and a first rotating electric machine are capable of applying power to a driven wheel via a power split device. A deactivating process deactivates combustion control in a deactivated cylinder that corresponds to one or more of cylinders of the internal combustion engine. A first compensation process sets, when the deactivating process is executed, torque of the first rotating electric machine to be larger than torque of the first rotating electric machine obtained prior to starting the deactivating process so as to compensate for at least some of a decrease amount of torque of the internal combustion engine resulting from the deactivating process.

6 Claims, 9 Drawing Sheets

(56) References Cited

U.S. PATENT DOCUMENTS

| | | | |
|---|---|---|---|
| 7,455,143 B2* | 11/2008 | Imura | B60W 10/08 |
| | | | 180/242 |
| 2002/0062806 A1* | 5/2002 | Suzuki | F02N 11/08 |
| | | | 123/179.3 |
| 2004/0012206 A1* | 1/2004 | Wakashiro | B60L 50/16 |
| | | | 290/40 C |
| 2004/0035113 A1* | 2/2004 | Hanada | F02D 41/0087 |
| | | | 903/917 |
| 2006/0207811 A1* | 9/2006 | Miyao | B60W 10/08 |
| | | | 180/65.28 |
| 2007/0222407 A1* | 9/2007 | Sakamoto | G05D 19/02 |
| | | | 318/611 |
| 2007/0254776 A1* | 11/2007 | Wakashiro | B60W 20/00 |
| | | | 477/181 |
| 2009/0145381 A1* | 6/2009 | Watanabe | F01L 1/267 |
| | | | 123/192.1 |
| 2016/0121875 A1* | 5/2016 | Aikawa | B60W 20/10 |
| | | | 180/65.265 |
| 2018/0156097 A1* | 6/2018 | Suzuki | F01N 3/029 |
| 2022/0080947 A1 | 3/2022 | Sugimoto | |
| 2022/0111827 A1 | 4/2022 | Sugimoto | |

FOREIGN PATENT DOCUMENTS

| | | |
|---|---|---|
| JP | 2010260392 A | 11/2010 |
| JP | 2015205622 A | 11/2015 |
| WO | 2019238246 A1 | 12/2019 |

* cited by examiner

Fig.5
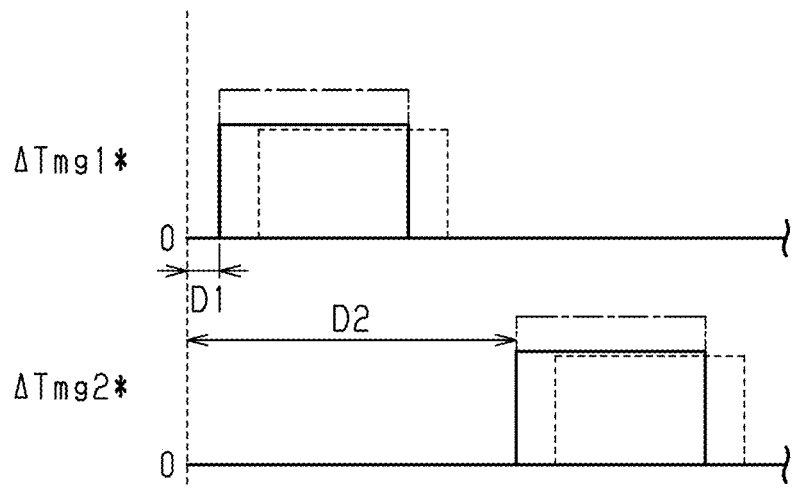
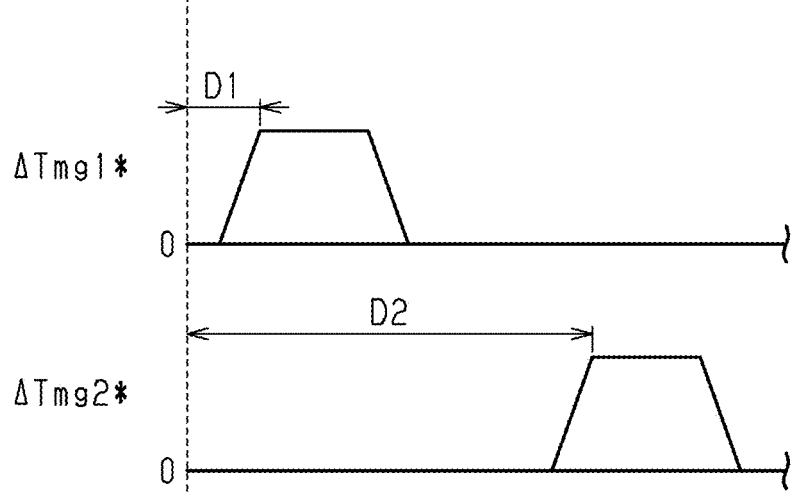
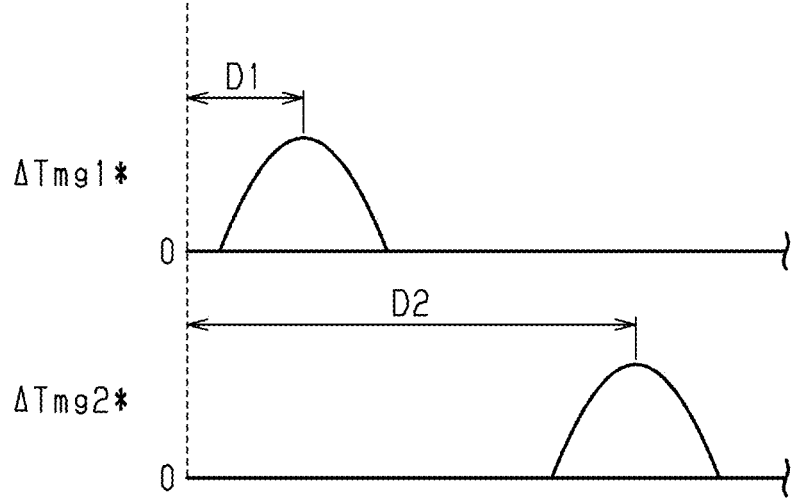

Fig.9
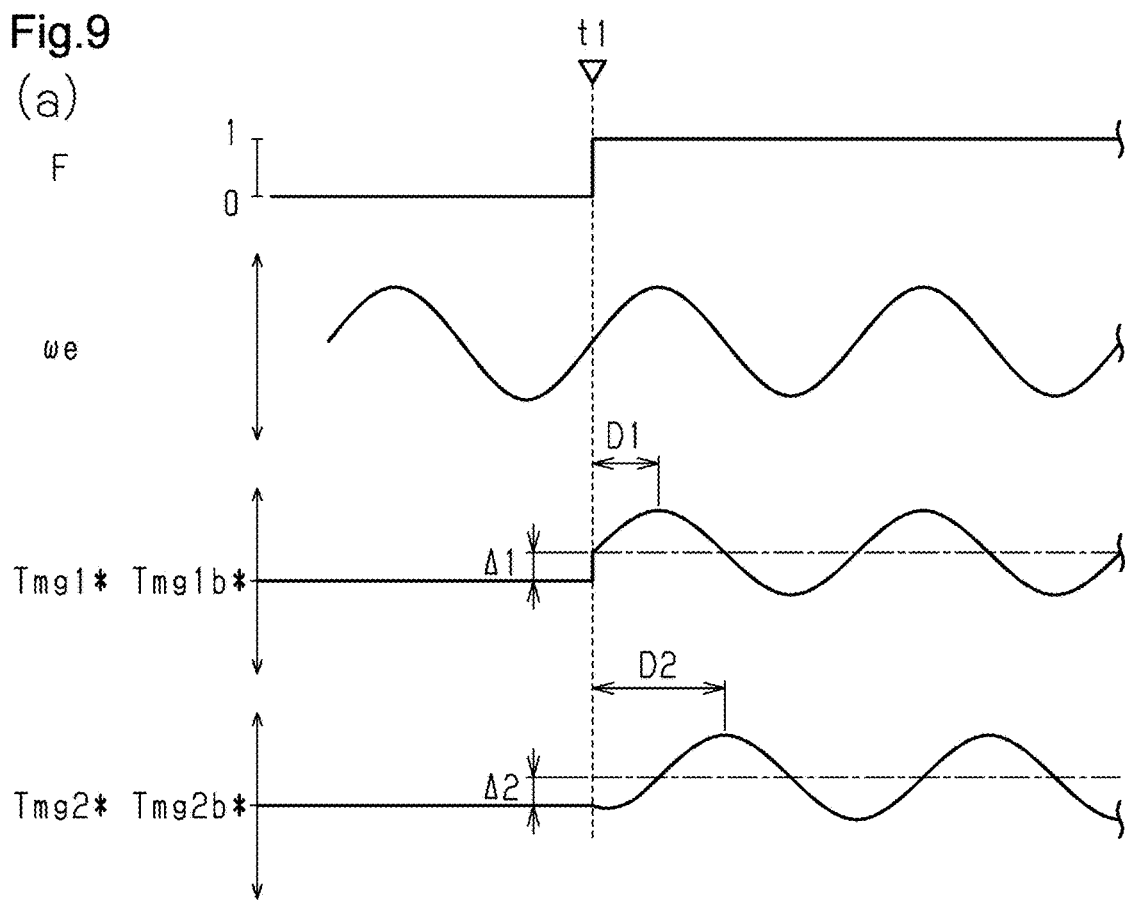
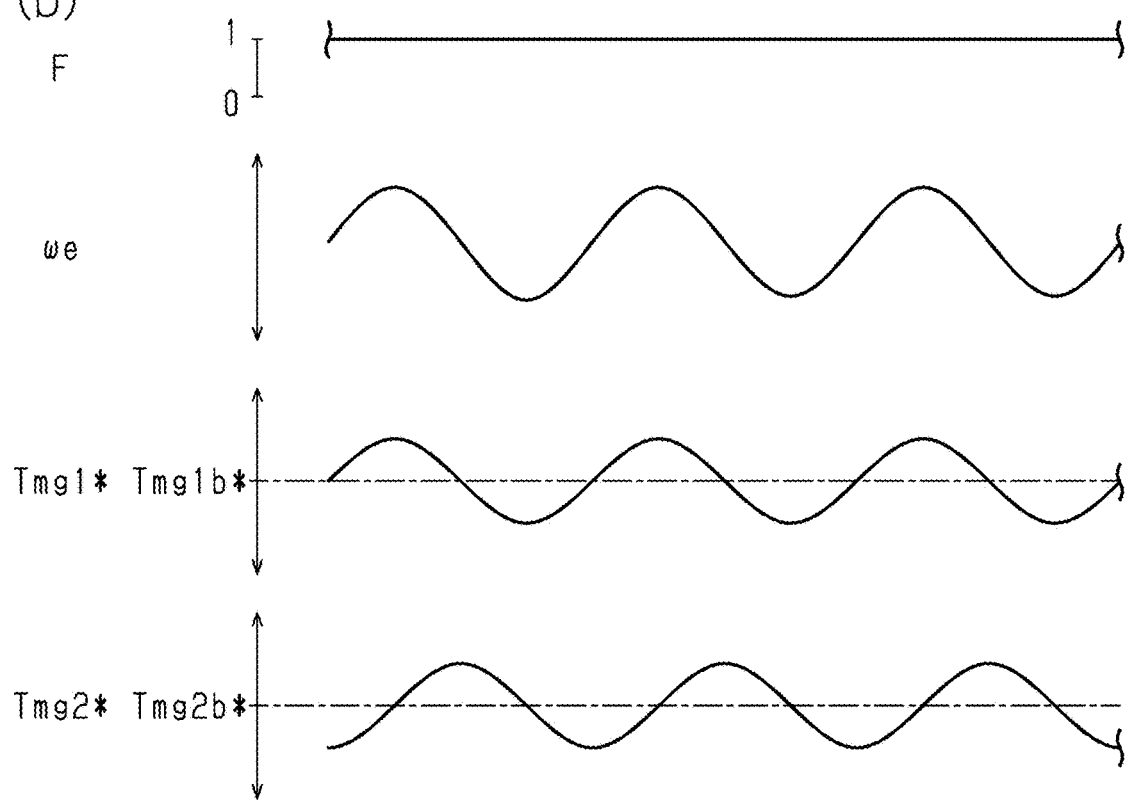

CONTROLLER FOR HYBRID ELECTRIC VEHICLE AND CONTROL METHOD FOR HYBRID ELECTRIC VEHICLE

RELATED APPLICATIONS

The present application claims priority of Japanese Application Number 2021-027699 filed on Feb. 24, 2021, the disclosure of which is hereby incorporated by reference herein in its entirety.

BACKGROUND

1. Field

The present disclosure relates to a controller for a hybrid electric vehicle and a control method for a hybrid electric vehicle.

2. Description of Related Art

Japanese Laid-Open Patent Publication No. 2010-260392 discloses an example of a hybrid electric vehicle. The hybrid electric vehicle includes a power distribution-integration mechanism. An internal combustion engine, a first motor generator, a second motor generator, and driven wheels are mechanically connected to the power distribution-integration mechanism. The internal combustion engine and the first motor generator are mechanically connected to the driven wheels via the power distribution-integration mechanism. The second motor generator is directly connected to the driven wheels without going through the power distribution-integration mechanism.

The above-described document discloses that when combustion control is deactivated in one or more of cylinders of the internal combustion engine, the second motor generator compensates for a decrease amount of torque resulting from the deactivation of the combustion control.

The deactivation of combustion control causes the vehicle to vibrate. Such vibration may be unable to be sufficiently limited only by the second motor generator compensating for the torque during the deactivation of the combustion control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: An aspect of the present disclosure provides a controller for a hybrid electric vehicle. The controller is employed in the hybrid electric vehicle that includes an internal combustion engine, a first rotating electric machine, a second rotating electric machine, a driven wheel, and a power split device. The internal combustion engine and the first rotating electric machine are capable of applying power to the driven wheel via the power split device. The second rotating electric machine is capable of applying power to the driven wheel without going through the power split device. The internal combustion engine includes cylinders. The controller is configured to execute a deactivating process that deactivates combustion control in a deactivated cylinder, the deactivated cylinder corresponding to one or more of the cylinders of the internal combustion engine and a first compensation process that sets, when the deactivating process is executed, torque of the first rotating electric machine to be larger than torque of the first rotating electric machine obtained prior to starting the deactivating process so as to compensate for at least some of a decrease amount of torque of the internal combustion engine resulting from the deactivating process.

If only the second rotating electric machine compensates for at least some of the decrease amount of the internal combustion engine resulting from the deactivating process, torque fluctuation resulting from the torque decrease in the internal combustion engine occurs in the first rotating electric machine. This potentially vibrates the vehicle. In the above-described configuration, the torque of the first rotating electric machine is increased so as to compensate for at least some of the decrease amount of the torque of the internal combustion engine. Thus, the above-described problem is minimized.

Aspect 2: In the controller according to Aspect 1, the controller is further configured to execute a second compensation process. The second compensation process sets, when the deactivating process is executed, torque of the second rotating electric machine to be larger than torque of the second rotating electric machine obtained prior to starting the deactivating process so as to compensate for at least some of the decrease amount of the torque of the internal combustion engine resulting from the deactivating process.

In order to limit the vibration of the vehicle resulting from the deactivating process, the inventors of the present application made a comparison between a case of using only the torque of the first rotating electric machine, a case of using only the torque of the second rotating electric machine, and a case of using the torque of the first rotating electric machine and the torque of the second rotating electric machine with each other. The inventors found that the vibration of the vehicle resulting from the deactivating process is minimized in the case of using the torque of the first rotating electric machine and the torque of the second rotating electric machine in order to limit the vibration of the vehicle resulting from the deactivating process. Thus, the above-described configuration uses the torque of the second rotating electric machine in addition to the torque of the first rotating electric machine in order to limit the vibration of the vehicle resulting from the deactivating process. This limits the vibration of the vehicle.

Aspect 3: In the controller according to Aspect 2, a first output increase amount is an increase amount of an output of the first rotating electric machine resulting from an increase in the torque of the first rotating electric machine obtained by the first compensation process. A second output increase amount is an increase amount of an output of the second rotating electric machine resulting from an increase in the torque of the second rotating electric machine obtained by the second compensation process. The controller is configured to execute the first compensation process and the second compensation process such that an average value of a sum of the first output increase amount and the second output increase amount in a given time becomes equal to the decrease amount of an output of the internal combustion engine resulting from the deactivating process in the given time.

The above-described configuration uses the first rotating electric machine and the second rotating electric machine to accurately compensate for an output that becomes deficient due to the deactivating process.

Aspect 4: In the controller according to Aspect 2 or 3, a compression top dead center occurrence cycle indicates a cycle during which a compression top dead center occurs in the internal combustion engine. The first compensation process cyclically fluctuates the torque of the first rotating electric machine in a cycle of an integral multiple of the compression top dead center occurrence cycle. The second rotating electric machine cyclically fluctuates the torque of the second rotating electric machine in a cycle of an integral multiple of the compression top dead center occurrence cycle.

Even if the deactivating process is not executed, the torque of the internal combustion engine fluctuates in the compression top dead center occurrence cycle. Further, when the deactivating process is executed, the torque of the internal combustion engine fluctuates in the compression top dead center occurrence cycle of the deactivated cylinder where combustion control is deactivated. Thus, the fluctuation of the torque of the internal combustion engine tends to be an integral multiple of the compression top dead center occurrence cycle. Accordingly, the above-described configuration treats the torque of the first rotating electric machine and the torque of the second rotating electric machine as the torque that fluctuates in a cycle of an integral multiple of the compression top dead center occurrence cycle. Therefore, the torque fluctuation resulting from the deactivating process is reduced in a favorable manner. This allows the above-described configuration to limit the vibration of the vehicle in a favorable manner.

Aspect 5: In the controller according to Aspect 4, the controller is further configured to execute an energy increasing process. The energy increasing process increases a combustion energy amount of a cylinder that differs from the deactivated cylinder of the internal combustion engine so as to compensate for the decrease in an output of the internal combustion engine resulting from the deactivating process. The average value of the first output increase amount is the average value, in a given time, of an increase amount of an output of the first rotating electric machine resulting from the increase in the torque of the first rotating electric machine. The average value of the second output increase amount is the average value, in the given time, of an increase amount of an output of the second rotating electric machine resulting from the increase in the torque of the second rotating electric machine. The first compensation process cyclically fluctuates, when the deactivating process is executed, the average value of the first output increase amount even after decreasing the average value to zero from a value greater than zero. The second compensation process cyclically fluctuates, when the deactivating process is executed, the average value of the second output increase amount even after decreasing the average value to zero from a value greater than zero.

In the above-described configuration, the decrease in the output of the internal combustion engine resulting from the deactivating process is compensated for by the internal combustion engine when the energy increasing process is executed. However, a response delay occurs in the process that increases the combustion energy amount of a cylinder that differs from the deactivated cylinder where combustion control is deactivated. In the above-described configuration, the first compensation process and the second compensation process are executed to compensate for the decrease in the output of the internal combustion engine resulting from the response delay of the energy increasing process.

Even if the energy increasing process compensates for the decrease in the output of the internal combustion engine, it does not stop the fluctuation of the torque of the internal combustion engine in the compression top dead center occurrence cycle of the deactivated cylinder in which combustion control is deactivated. Thus, the deactivating process causes the vehicle to vibrate. In the above-described configuration, even after the average value of the increase amount of the output of the first rotating electric machine and the average value of the increase amount of the output of the second rotating electric machine are set to zero, the process that fluctuates the torque of the first rotating electric machine and the torque of the second rotating electric machine is continued. This limits the vibration of the vehicle.

Aspect 6: In the controller according to Aspect 5, the torque of the first rotating electric machine includes a local maximum. A point in time of the local maximum of the first rotating electric machine is delayed with respect to the compression top dead center of the deactivated cylinder subject to the deactivating process by a first delay amount. The torque of the second rotating electric machine includes a local maximum. A point in time of the local maximum of the second rotating electric machine is delayed with respect to the compression top dead center of the deactivated cylinder subject to the deactivating process by a second delay amount. The local maxima are extrema where positive torque is applied to the driven wheel. The second delay amount is set to be different from the first delay amount.

The inventors measured the vibration of the vehicle while adjusting the phase of the torque of the first rotating electric machine and the phase of the torque of the second rotating electric machine. As a result, the inventors found that the two phases, which are suitable for limiting the vibration of the vehicle, each have a different tendency. In the above-described configuration, the second delay amount is set to be different from the first delay amount. This sufficiently limits the vibration of the vehicle.

Aspect 7, In the controller according to Aspect 6, the second delay amount is set to be greater than the first delay amount.

In the above-described configuration, the decrease in the torque of the internal combustion engine resulting from the deactivating process occurs in the first rotating electric machine earlier than in the second rotating electric machine. This limits the vibration of the vehicle in a favorable manner.

Aspect 8: In the controller according to Aspect 4 or 5, a cyclic fluctuation amount of the torque of the first rotating electric machine is represented by an amplitude of the torque of the first rotating electric machine. The first compensation process includes a process that sets the amplitude of the torque of the first rotating electric machine to be larger when an engine requested torque for the internal combustion engine is large than when the engine requested torque is small.

The torque fluctuation of the internal combustion engine resulting from the deactivating process is greater when the engine requested torque for the internal combustion engine is large than when the engine requested torque is small. The above-described configuration sets the amplitude, which is the cyclic fluctuation amount of the torque of the first rotating electric machine, to be larger when the engine requested torque is large than when the engine requested torque is small. Thus, the above-described configuration makes the torque fluctuation of the internal combustion engine less affected than, for example, a configuration in which the magnitude of the amplitude is not changed in correspondence with the engine requested torque.

Aspect 9: In the controller according to Aspect 4 or 5, the first compensation process includes a process that changes a waveform of the torque of the first rotating electric machine while setting a cycle of the torque of the first rotating electric machine to an integral multiple of the compression top dead center occurrence cycle in the internal combustion engine.

In the above-described configuration, the first compensation process includes the process that changes the waveform of the torque of the first rotating electric machine. Thus, the above-described configuration provides a larger degree of freedom for limiting the vibration of the vehicle than, for example, a configuration in which the waveform of the torque of the first rotating electric machine is fixed. Accordingly, the above-described configuration limits the vibration of the vehicle more easily than, for example, the configuration in which the waveform of the torque of the first rotating electric machine is fixed.

Aspect 10: Another aspect of the present disclosure provides a controller for a hybrid electric vehicle. The controller is employed in the hybrid electric vehicle that includes an internal combustion engine, a first rotating electric machine, a second rotating electric machine, a driven wheel, and a power split device. The internal combustion engine and the first rotating electric machine are capable of applying power to the driven wheel via the power split device. The second rotating electric machine is capable of applying power to the driven wheel without going through the power split device. The internal combustion engine includes cylinders. The controller is configured to execute a deactivating process that deactivates combustion control in a deactivated cylinder, the deactivated cylinder corresponding to one or more of the cylinders of the internal combustion engine, a first fluctuation process that cyclically fluctuates, when the deactivating process is executed, torque of the first rotating electric machine in a cycle of an integral multiple of a compression top dead center occurrence cycle in the internal combustion engine, the compression top dead center occurrence cycle indicating a cycle during which a compression top dead center occurs in the internal combustion engine, and a second fluctuation process that cyclically fluctuates, when the deactivating process is executed, torque of the second rotating electric machine in a cycle of an integral multiple of the compression top dead center occurrence cycle in the internal combustion engine.

In order to limit the vibration of the vehicle resulting from the deactivating process, the inventors made a comparison between a case of using only the torque of the first rotating electric machine, a case of using only the torque of the second rotating electric machine, and a case of using the torque of the first rotating electric machine and the torque of the second rotating electric machine. The inventors found that the vibration of the vehicle resulting from the deactivating process is minimized in the case of using the torque of the first rotating electric machine and the torque of the second rotating electric machine. Thus, the above-described configuration uses the torque of the second rotating electric machine in addition to the torque of the first rotating electric machine so as to limit the vibration of the vehicle resulting from the deactivating process.

Aspect 11: A method for controlling an internal combustion engine that executes various processes according to any one of the above-described aspects is provided.

Aspect 12: A non-transitory computer-readable memory medium that stores a program that causes a processor to execute the various processes according to any one of the above-described aspects is provided.

Other features and aspects will be apparent from the following detailed description, the drawings, and the claims.

BRIEF DESCRIPTION OF THE DRAWINGS

FIG. 5 is a timing diagram illustrating waveforms of the superimposed torques of the embodiment in FIG. 1, including sections (a) to (c).

FIG. 9 is a timing diagram illustrating changes in the superimposed torques of the embodiment in FIG. 7, including sections (a) and (b).

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to FIGS. 1 to 6.

Figure 1:
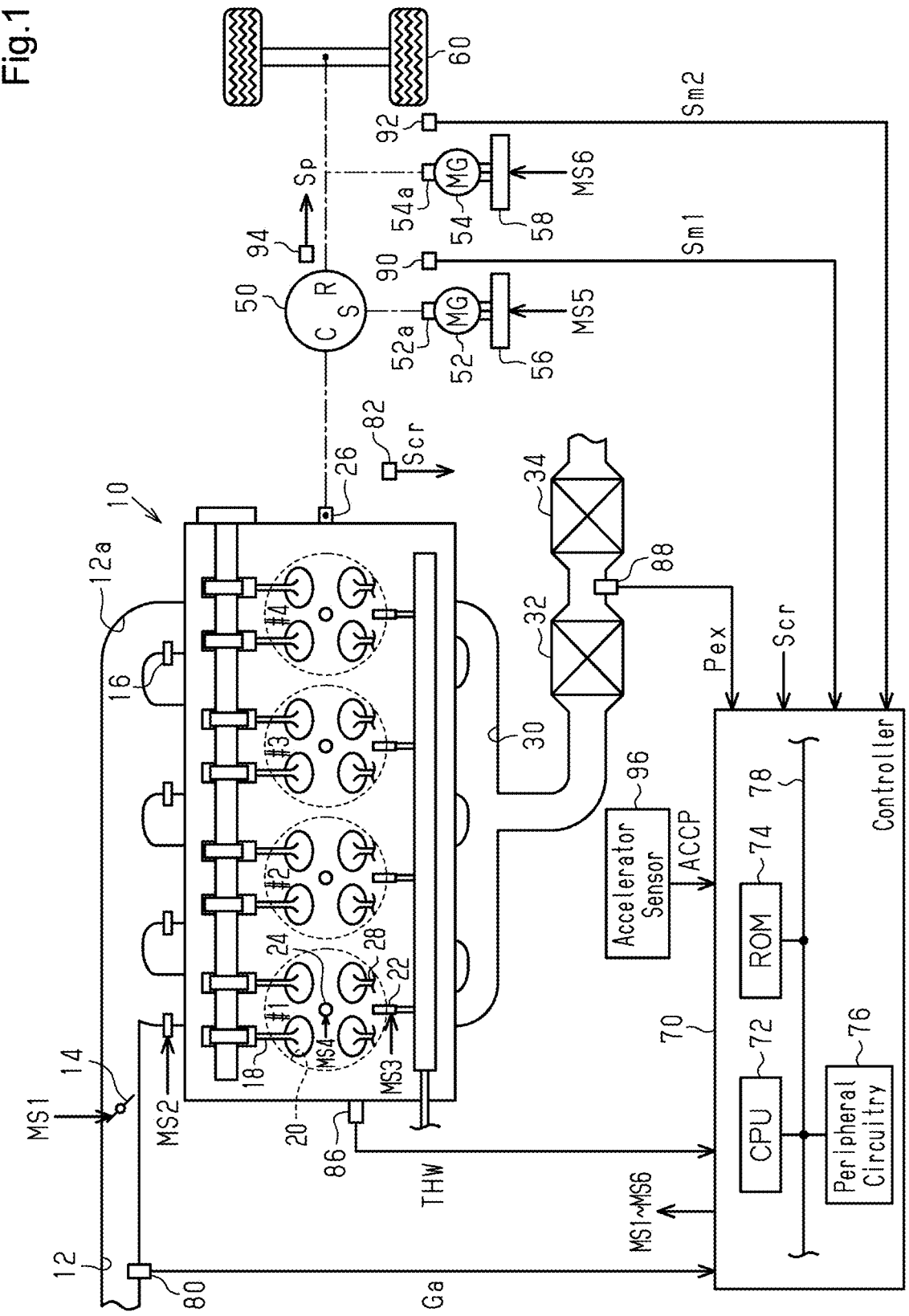
FIG. 1 is a diagram showing the configuration of a hybrid electric vehicle according to a first embodiment.

As shown in FIG. 1, an internal combustion engine 10 of a hybrid electric vehicle includes four cylinders #1 to #4. The internal combustion engine 10 includes an intake passage 12 provided with a throttle valve 14. An intake port 12a at a downstream portion of the intake passage 12 includes port injection valves 16. Each of the port injection valves 16 injects fuel into the intake port 12a. The air drawn into the intake passage 12 and the fuel injected from the port injection valves 16 flow into combustion chambers 20 as intake valves 18 open. Fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes a three-way catalyst 32 having an oxygen storage capacity and a gasoline particulate filter (GPF) 34. In the GPF 34, the three-way catalyst is supported by a PM-trapping filter.

A planetary gear mechanism 50 corresponds to a power split device. The crankshaft 26 is mechanically coupled to a carrier C of the planetary gear mechanism 50. A rotary shaft 52a of a first motor generator 52 is mechanically coupled to a sun gear S of the planetary gear mechanism 50. Further, a rotary shaft 54a of a second motor generator 54 and driven wheels 60 are mechanically coupled to a ring gear R of the planetary gear mechanism 50. A first inverter 56 applies alternating-current voltage to a terminal of the first motor generator 52. A second inverter 58 applies alternating-current voltage to a terminal of the second motor generator 54. That is, the internal combustion engine 10 and the first motor generator 52 (first rotating electric machine) are capable of applying power to the driven wheels 60 via the planetary gear mechanism 50 (power split device). The second motor generator 54 (second rotating electric machine) is capable of applying power to the driven wheels 60 without going through the planetary gear mechanism 50.

The internal combustion engine 10 is controlled by a controller 70. In order to control the controlled variables of the internal combustion engine 10 (for example, torque or exhaust component ratio), the controller 70 operates operation units of the internal combustion engine 10 such as the throttle valve 14, the port injection valves 16, the direct injection valves 22, and the ignition plug 24. The controller 70 also controls the first motor generator 52, and operates the first inverter 56 in order to control torque (controlled variable) of the first motor generator 52. The controller 70 further controls the second motor generator 54, and operates the second inverter 58 in order to control torque (controlled variable) of the second motor generator 54. FIG. 1 shows operation signals MS1 to MS6 that correspond to the throttle valve 14, the port injection valves 16, the direct injection valves 22, the ignition plugs 24, the first inverter 56, and the second inverter 58, respectively. In order to control the controlled variables of the internal combustion engine 10, the controller 70 refers to an intake air amount Ga detected by an air flow meter 80, an output signal Scr of a crank angle sensor 82, a water temperature THW detected by a water temperature sensor 86, a pressure Pex of exhaust gas flowing into the GPF 34. The pressure Pex is detected by an exhaust pressure sensor 88. In order to control the controlled variables of the first motor generator 52, the controller 70 refers to an output signal Sm1 of a first rotation angle sensor 90 that detects the rotation angle of the first motor generator 52. In order to control the controlled variables of the second motor generator 54, the controller 70 refers to an output signal Sm2 of a second rotation angle sensor 92 that detects the rotation angle of the second motor generator 54. The controller 70 refers to an output signal Sp of an output-side rotation angle sensor that detects the rotation angle of the ring gear R. The controller 70 refers to an accelerator operation amount ACCP (the depression amount of the accelerator pedal detected by an accelerator sensor 96).

The controller 70 includes a CPU 72, a ROM 74, and peripheral circuitry 76. These components are capable of communicating with one another via a communication line 78. The peripheral circuitry 76 includes, for example, a circuit that generates a clock signal regulating operations inside the controller 70, a power supply circuit, and a reset circuit. The controller 70 controls the controlled variables by causing the CPU 72 to execute programs stored in the ROM 74.

The processes executed by the controller 70 include a base process, a regenerating process for the GPF 34, and a vibration limiting process that follows the regenerating process. These processes will now be described in this order.

Base Process

Figure 2:
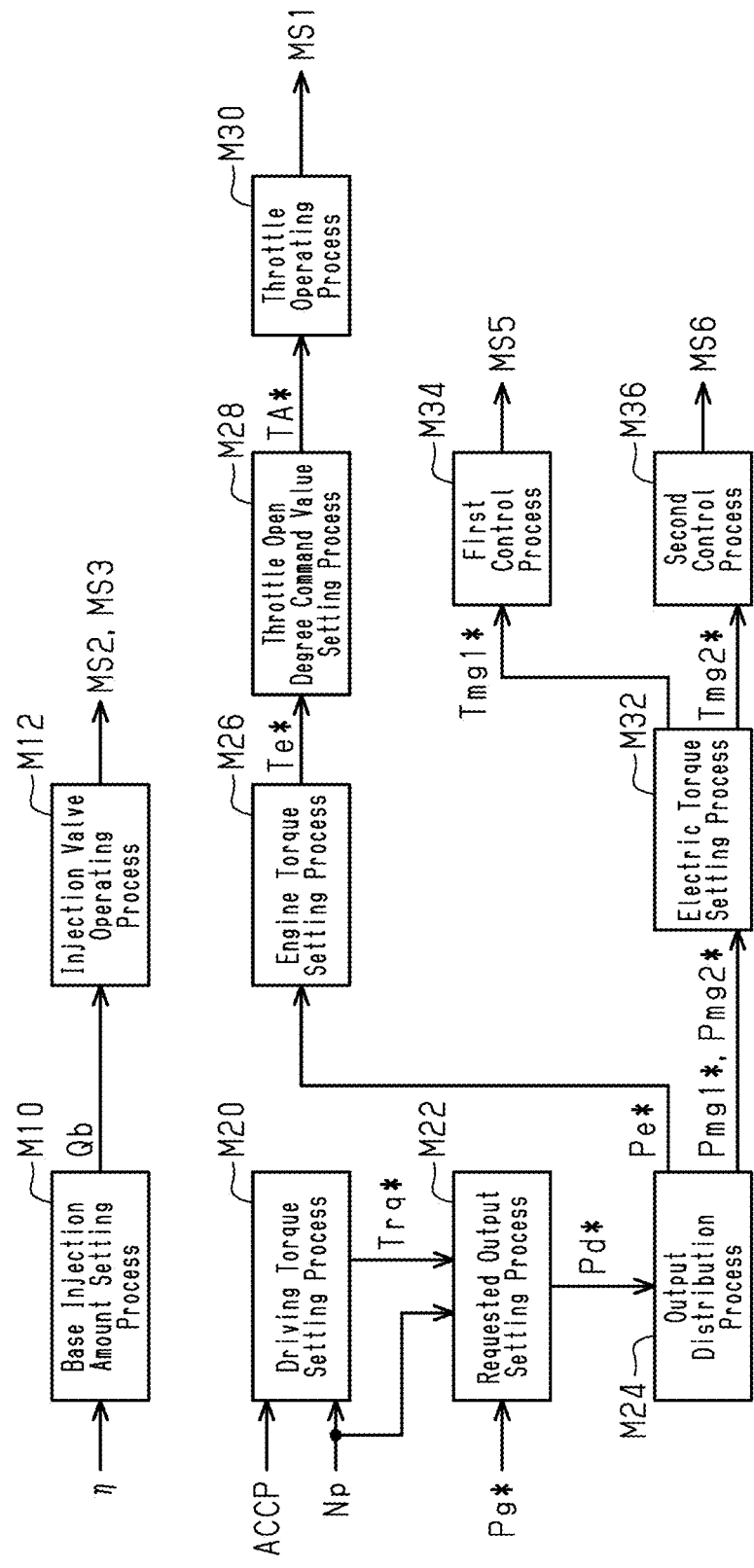
FIG. 2 is a block diagram illustrating processes executed by the controller of the embodiment in FIG. 1.

FIG. 2 shows part of the processes executed by the controller 70. The processes shown in FIG. 2 are implemented by the CPU 72 executing the programs stored in the ROM 74.

A base injection amount setting process M10 uses a charging efficiency η to calculate a base injection amount Qb. The base injection amount Qb is an injection amount used to set the air-fuel ratio of the air-fuel mixture in the combustion chamber 20 to a target air-fuel ratio. The target air-fuel ratio is a stoichiometric air-fuel ratio. The charging efficiency η is calculated by the CPU 72 in reference to the engine rotation speed NE and the intake air amount Ga. The engine rotation speed NE is calculated by the CPU 72 in reference to the output signal Scr.

An injection valve operating process M12 operates the port injection valves 16 and the direct injection valves 22 using the base injection amount Qb as an input.

A driving torque setting process M20 calculates a requested driving torque Trq* using the accelerator operation amount ACCP and an output-side rotation speed Np. The requested driving torque Trq* is a requested torque for each of the driven wheels 60. The output-side rotation speed Np is the rotation speed of the ring gear R. The output-side rotation speed Np is calculated by the CPU 72 in reference to the output signal Sp.

A requested output setting process M22 calculates a requested output Pd* using the requested driving torque Trq*, the output-side rotation speed Np, and a requested power generation amount Pg* for the first motor generator 52. The requested output Pd* is a requested amount for the total amount of the output of the internal combustion engine 10, the output of the first motor generator 52, and the output of the second motor generator 54.

An output distribution process M24 allocates the requested output Pd* to an engine requested output Pe*, a first requested output Pmg1*, and a second requested output Pmg2*. This leads to the equation Pd*=Pe*+Pmg1*+Pmg2*. The engine requested output Pe* is a requested output for the internal combustion engine 10. The first requested output Pmg1* is a requested output for the first motor generator 52. The second requested output Pmg2* is a requested output for the second motor generator 54.

A requested torque setting process M26 calculates an engine requested torque Te* using the engine requested output Pe*. The engine requested torque Te* is a requested torque for the internal combustion engine 10. A throttle open degree command value setting process M28 sets an open degree command value TA* using the engine requested torque Te*. The open degree command value TA* is a command value of the open degree of the throttle valve 14. A throttle operating process M30 outputs the operation signal MS1 to the throttle valve 14 in order to control the open degree of the throttle valve 14 to the open degree command value TA*.

An electric torque setting process M32 sets a first requested torque Tmg1* using the first requested output Pmg1*. The first requested torque Tmg1* is a requested torque for the first motor generator 52. The electric torque setting process M32 also sets a second requested torque Tmg2* using the second requested output Pmg2*. The second requested torque Tmg2* is a requested torque for the second motor generator 54.

A first control process M34 outputs the operation signal MS5 to the first inverter 56 in order to control the torque of the first motor generator 52 to the first requested torque Tmg1*. A second control process M36 outputs the operation signal MS6 to the second inverter 58 in order to control the torque of the second motor generator 54 to the second requested torque Tmg2*.

Regenerating Process for GPF 34

Figure 3:
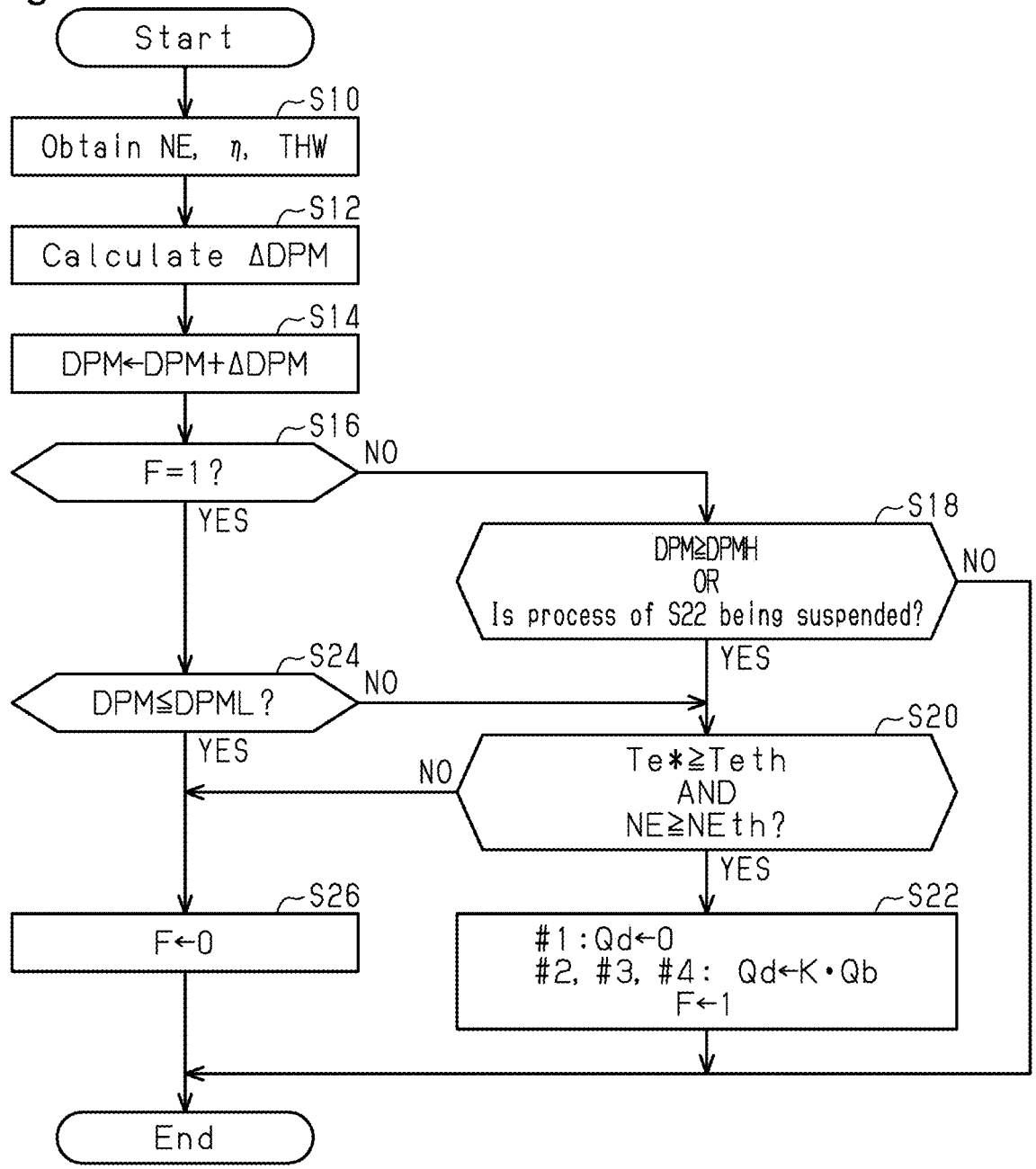
FIG. 3 is a flowchart illustrating a procedure of processes executed by the controller in the embodiment of FIG. 1.

FIG. 3 shows a procedure of the regenerating process for the GPF 34. The processes shown in FIG. 3 are executed by the CPU 72 repeatedly executing programs stored in the ROM 74, for example, in a specific cycle. In the following description, the number of each step is represented by the letter S followed by a numeral.

In the series of processes shown in FIG. 3, the CPU 72 first obtains the engine rotation speed NE, the charging efficiency η, and the water temperature THW (S10). Next, the CPU 72 uses the engine rotation speed NE, the charging efficiency η, and the water temperature THW to calculate an update amount ΔDPM of a deposition amount DPM (S12). The deposition amount DPM is the amount of PM trapped by the GPF 34. More specifically, the CPU 72 uses the engine rotation speed NE, the charging efficiency η, and the water temperature THW to calculate the amount of PM in the exhaust gas discharged to the exhaust passage 30. Further, the CPU 72 uses the engine rotation speed NE and the charging efficiency η to calculate the temperature of the GPF 34. The CPU 72 uses the amount of PM in exhaust gas and the temperature of the GPF 34 to calculate the update amount ΔDPM. When executing the process of S22 (described later), the CPU 72 simply needs to use an increase coefficient K to calculate the temperature of the GPF 34 and the update amount ΔDPM.

Then, the CPU 72 updates the deposition amount DPM in correspondence with the deposition amount DPM (S14). Subsequently, the CPU 72 determines whether an execution flag F is 1 (S16). When the execution flag F is 1, the execution flag F indicates that the temperature-increasing process is being executed to burn and remove the PM in the GPF 34. When the execution flag F is 0, the execution flag F indicates that the regenerating process is not being executed. When determining that the execution flag F is 0 (S16: NO), the CPU 72 determines whether the logical disjunction is true of a condition in which the deposition amount DPM is greater than or equal to a regeneration execution value DPMH and a condition in which the process of S22 (described later) is suspended in the current period (S18). The regeneration execution value DPMH is set to a value in which PM needs to be removed because the amount of PM trapped by the GPF 34 is large.

When determining that the logical disjunction of S18 is true (S18: YES), the CPU 72 determines whether the logical conjunction of the following conditions (A) and (B) is true (S20). The conditions (A) and (B) are the conditions for executing the temperature-increasing process.

Condition (A): The engine requested torque Te* is greater than or equal to a specific value Teth. The specific value Teth is set using the lower limit value at which the torque accelerating the driven wheels 60 is applied from the crankshaft 26 to the driven wheels 60. Condition (A) is that the internal combustion engine 10 is operated with load.

Condition (B): The engine rotation speed NE is greater than or equal to a specific speed NEth.

When determining that the logical conjunction of the following conditions (A) and (B) is true (S20: YES), the CPU 72 executes the temperature-increasing process and substitutes 1 into the execution flag F (S22). In the temperature-increasing process of the present embodiment, the CPU 72 deactivates the injection of fuel from the port injection valve 16 and the direct injection valve 22 of cylinder #1 and makes the air-fuel ratio of the air-fuel mixture in the combustion chambers 20 of cylinders #2, #3, #4 richer than the stoichiometric air-fuel ratio. In the present embodiment, cylinder #1 corresponds to a deactivated cylinder, that is, one or more of the cylinders in which combustion control is deactivated. The process of S22 includes a first technical aspect and a second technical aspect. The first one is to increase the temperature of the three-way catalyst 32. That is, this process causes oxygen and unburned fuel to be discharged to the exhaust passage 30 so as to oxidize the unburned fuel in the three-way catalyst 32 and thus increase the temperature of the three-way catalyst 32. The second technical aspect is to increase the temperature of the GPF 34 so as to supply the heated GPF 34 with oxygen, thereby oxidizing and removing the PM trapped by the GPF 34. That is, when the temperature of the three-way catalyst 32 increases, the temperature GPF 34 is increased by the flow of high-temperature exhaust gas into the GPF 34. When oxygen flows into the heated GPF 34, the PM trapped by the GPF 34 is oxidized and thus removed.

More specifically, the CPU 72 substitutes 0 into requested injection amounts Qd for the port injection valve 16 and the direct injection valve 22 of cylinder #1. Further, the CPU 72 substitutes, into the requested injection amount Qd of each of cylinders #2, #3, #4, the value obtained by multiplying the increase coefficient K by the base injection amount Qb.

The CPU 72 sets the increase coefficient K such that the unburned fuel of the exhaust gas discharged from cylinders #2, #3, #4 to the exhaust passage 30 becomes less than or equal to an amount that reacts with the oxygen discharged from cylinder #1 without excess or deficiency. More specifically, at the beginning of the regenerating process for the GPF 34, the CPU 72 sets the air-fuel ratio of the air-fuel mixture in cylinders #2, #3, #4 to be maximally close to the amount that reacts with the oxygen discharged from cylinder #1 without excess or deficiency so as to quickly increase the temperature of the three-way catalyst 32.

When determining that the execution flag F is 1 (S16: YES), the CPU 72 determines whether the deposition amount DPM is less than or equal to a deactivation threshold value DPML (S24). The deactivation threshold value DPML is set to a value in which the regenerating process is allowed to be deactivated because the amount of PM trapped by the GPF 34 is sufficiently small. When determining that the deposition amount DPM is greater than the deactivation threshold value DPML (S24: NO), the CPU 72 proceeds to the process of S20.

When determining that the deposition amount DPM is less than or equal to the deactivation threshold value DPML (S24: YES) or making a negative determination in the process of S20, the CPU 72 deactivates or suspends the process of S22 to substitute 0 into the execution flag F (S26). When making an affirmative determination the process of S24, the CPU 72 determines that the process of S22 is completed and then deactivates the process of S22. When making a negative determination the process of S20, the CPU 72 determines that the process of S22 is not completed and then suspends the process of S22.

When completing the process of S22, S26 or when making a negative determination in the process of S18, the CPU 72 temporarily ends the series of processes shown in FIG. 2.

Vibration Limiting Process

When the regenerating process for the GPF 34 is executed, the controller 70 executes a process that limits the vibration of the vehicle resulting from the regenerating process. In the vibration limiting process, the first motor generator 52 and the second motor generator 54 are operated. The vibration limiting process changes the base process shown in FIG. 2.

Figure 4:
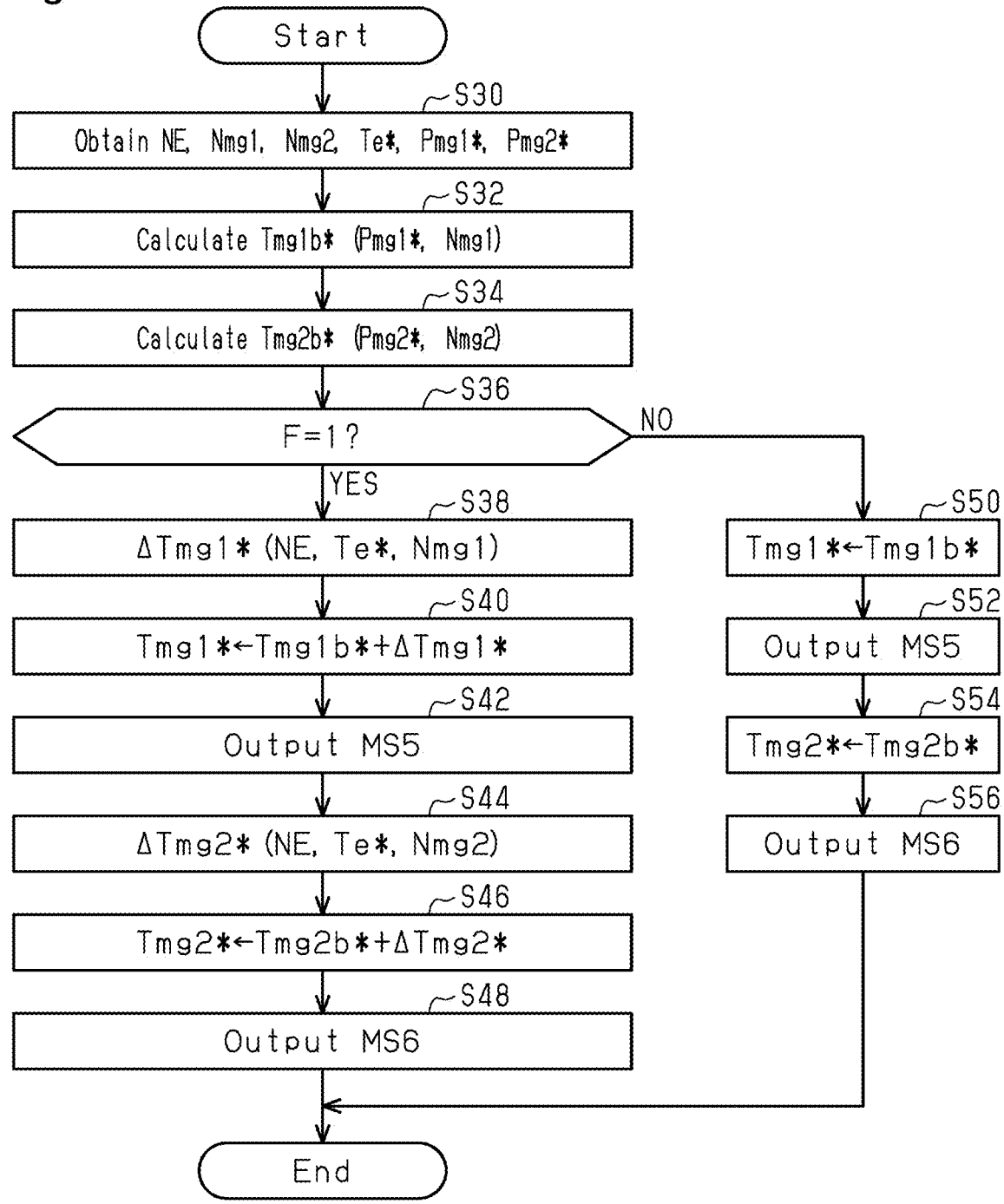
FIG. 4 is a flowchart illustrating a procedure of processes executed by the controller in the embodiment of FIG. 1.

FIG. 4 shows a procedure of processes for limiting the vibration of the vehicle resulting from the regenerating process. The vibration limiting process shown in FIG. 4 is executed by the CPU 72 repeatedly executing programs stored in the ROM 74, for example, in a specific cycle.

In the series of processes shown in FIG. 4, the CPU 72 first obtains the engine rotation speed NE, a first rotation speed Nmg1, a second rotation speed Nmg2, the engine requested torque Te*, the first requested output Pmg1*, and the second requested output Pmg2* (S30). The first rotation speed Nmg1 is the rotation speed of the rotary shaft 52a of the first motor generator 52. The first rotation speed Nmg1 is calculated by the CPU 72 in reference to the output signal Sm1. The second rotation speed Nmg2 is the rotation speed of the rotary shaft 54a of the second motor generator 54. The second rotation speed Nmg2 is calculated by the CPU 72 in reference to the output signal Sm2.

Next, the CPU 72 substitutes, into a first requested torque base value Tmg1b*, the value obtained by dividing the first rotation speed Nmg1 by the first requested output Pmg1* (S32). Further, the CPU 72 substitutes, into a second requested torque base value Tmg2b*, the value obtained by dividing the second rotation speed Nmg2 by the second requested output Pmg2* (S34).

Subsequently, the CPU 72 determines whether the execution flag F is 1 (S36). When determining that the execution flag F is 1 (S36: YES), the CPU 72 calculates a first superimposed torque ΔTmg1* (S38). The first superimposed torque ΔTmg1* is used to limit the vibration of the vehicle resulting from the regenerating process. The CPU 72 uses the engine rotation speed NE, the engine requested torque Te*, and the first rotation speed Nmg1 to variably set the first superimposed torque ΔTmg1*. The CPU 72 variably sets the phase, magnitude, and waveform of the first superimposed torque ΔTmg1*. Subsequently, the CPU 72 substitutes, into the first requested torque Tmg1*, the value obtained by adding the first superimposed torque ΔTmg1* to the first requested torque base value Tmg1b* (S40). Then, the CPU 72 outputs the operation signal MS5 to the first inverter 56 in order to control the torque of the first motor generator 52 to the first requested torque Tmg1* (S42).

The CPU 72 calculates a second superimposed torque ΔTmg2* (S44). The second superimposed torque ΔTmg2* is used to limit the vibration of the vehicle resulting from the regenerating process. The CPU 72 uses the engine rotation speed NE, the engine requested torque Te*, and the second rotation speed Nmg2 to variably set the second superimposed torque ΔTmg2*. The CPU 72 variably sets the phase, magnitude, and waveform of the second superimposed torque ΔTmg2*. Subsequently, the CPU 72 substitutes, into the second requested torque Tmg2*, the value obtained by adding the second superimposed torque ΔTmg2* to the second requested torque base value Tmg2b* (S46). Then, the CPU 72 outputs the operation signal MS6 to the second inverter 58 in order to control the torque of the second motor generator 54 to the second requested torque Tmg2* (S48).

FIG. 5 show examples of the first superimposed torque ΔTmg1* calculated from the process of S38 and the second superimposed torque ΔTmg2* calculated from the process of S44.

Section (a) of FIG. 5 shows an example in which the waveforms of the first superimposed torque ΔTmg1* and the second superimposed torque ΔTmg2* are square. The pulse width of each square wave is, for example, 180° crank angle (CA). The pulse width is not limited to 180° CA and may be approximately 180±10° CA. A first delay amount D1 is an amount by which the point in time of the superimposition of the first superimposed torque ΔTmg1* is delayed with respect to the compression top dead center of cylinder #1. A second delay amount D2 is an amount by which the point in time of the superimposition of the second superimposed torque ΔTmg2* is delayed with respect to the compression top dead center of cylinder #1.

Section (b) of FIG. 5 shows an example in which the waveforms of the first superimposed torque ΔTmg1* and the second superimposed torque ΔTmg2* are trapezoidal. It is desirable that the width of the upper bottom of the trapezoidal waveform is smaller than the width of the lower bottom by approximately 1° CA to 5° CA. The first delay amount D1 is an amount by which the point in time of the first superimposed torque ΔTmg1* becoming the global maximum (local maximum) is delayed with respect to the compression top dead center of cylinder #1. The second delay amount D2 is an amount by which the point in time of the second superimposed torque ΔTmg2* becoming the global maximum (local maximum) is delayed with respect to the compression top dead center of cylinder #1. The local maxima of the first superimposed torque ΔTmg1* and the second superimposed torque ΔTmg2* are extrema where positive torque is applied to the driven wheels 60.

Section (c) of FIG. 5 shows an example in which the waveforms of the first superimposed torque ΔTmg1* and the second superimposed torque ΔTmg2* are semicircles of sine waves. It is desirable that the semicircle of each sine wave corresponds to a single rotation of the crankshaft 26. Instead, the semicircle of each sine wave may be, for example, approximately 360° CA±20° CA. The first delay amount D1 is an amount by which the point in time of the first superimposed torque ΔTmg1* becoming the global maximum is delayed with respect to the compression top dead center of cylinder #1. The second delay amount D2 is an amount by which the point in time of second superimposed torque ΔTmg2* becoming the global maximum is delayed with respect to the compression top dead center of cylinder #1.

In section (a) of FIG. 5, the first delay amount D1 is defined by an amount by which the point in time of the first superimposed torque ΔTmg1* becoming the global maximum is delayed with respect to the compression top dead center of cylinder #1. In the same manner, the second delay amount D2 is defined by an amount by which the point in time of the second superimposed torque ΔTmg2* becoming the global maximum is delayed with respect to the compression top dead center of cylinder #1.

The processes of S38 and S44 vary not only the waveforms of the first superimposed torque ΔTmg1* and the second superimposed torque ΔTmg2* but also the magnitudes and phases of the first superimposed torque ΔTmg1* and the second superimposed torque ΔTmg2*. Each of the broken lines in section (a) of FIG. 5 show an example in which the phase of the first superimposed torque ΔTmg1* is shifted from the corresponding solid line and an example in which the phase of the second superimposed torque ΔTmg2* is shifted from the corresponding solid line. In these examples, each broken line is delayed with respect to the corresponding solid line. Each of the alternate long and short dashed lines in section (a) of FIG. 5 shows an example in which the magnitude of the first superimposed torque ΔTmg1* is shifted from the corresponding solid line and an example in which the magnitude of the second superimposed torque ΔTmg2* is shifted from the corresponding solid line. In other words, the alternate long and short dashed lines show examples in which the amplitudes of the first superimposed torque ΔTmg1* and the second superimposed torque ΔTmg2* are increased with respect to the solid lines.

Superimposing the first superimposed torque ΔTmg1* on the first requested torque base value Tmg1b* and superimposing the second superimposed torque ΔTmg2* on the second requested torque base value Tmg2b* result in increases in the outputs of the first motor generator 52 and the second motor generator 54. The total amount of the increased outputs are set to be equal to the decrease amount of the output of the internal combustion engine 10 resulting from deactivating the combustion control in cylinder #1. This setting is made in order to set the total amount of the output of the internal combustion engine 10, the output of the first motor generator 52, and the output of the second motor generator 54 to the requested output Pd*.

The deactivation of the combustion control in cylinder #1 decreases the output of the internal combustion engine 10 to a larger extent when the engine requested torque Te* is large than when the engine requested torque Te* is small. Thus, the first superimposed torque ΔTmg1* and the second superimposed torque ΔTmg2* are set to larger values when the engine requested torque Te* is large than when the engine requested torque Te* is small. That is, the engine requested torque Te* corresponding to the first superimposed torque ΔTmg1* and the second superimposed torque ΔTmg2* shown by the alternate long and short dashed lines in section (a) of FIG. 5 are larger than the engine requested torque Te* corresponding to the first superimposed torque ΔTmg1* and the second superimposed torque ΔTmg2* shown by the solid lines.

Referring back to FIG. 4, when determining that the execution flag F is 0 (S36: NO), the CPU 72 substitutes the first requested torque base value Tmg1b* into the first requested torque Tmg1* (S50). Then, the CPU 72 outputs the operation signal MS5 to the first inverter 56 in order to control the torque of the first motor generator 52 to the first requested torque Tmg1* (S52). Subsequently, the CPU 72 substitutes the second requested torque base value Tmg2b* into the second requested torque Tmg2* (S54). Then, the CPU 72 outputs the operation signal MS6 to the second inverter 58 in order to control the torque of the second motor generator 54 to the second requested torque Tmg2* (S56).

When completing the process of step S48 or S56, the CPU 72 temporarily ends the series of processes shown in FIG. 4.

The operation and advantages of the present embodiment will now be described.

Figure 6:
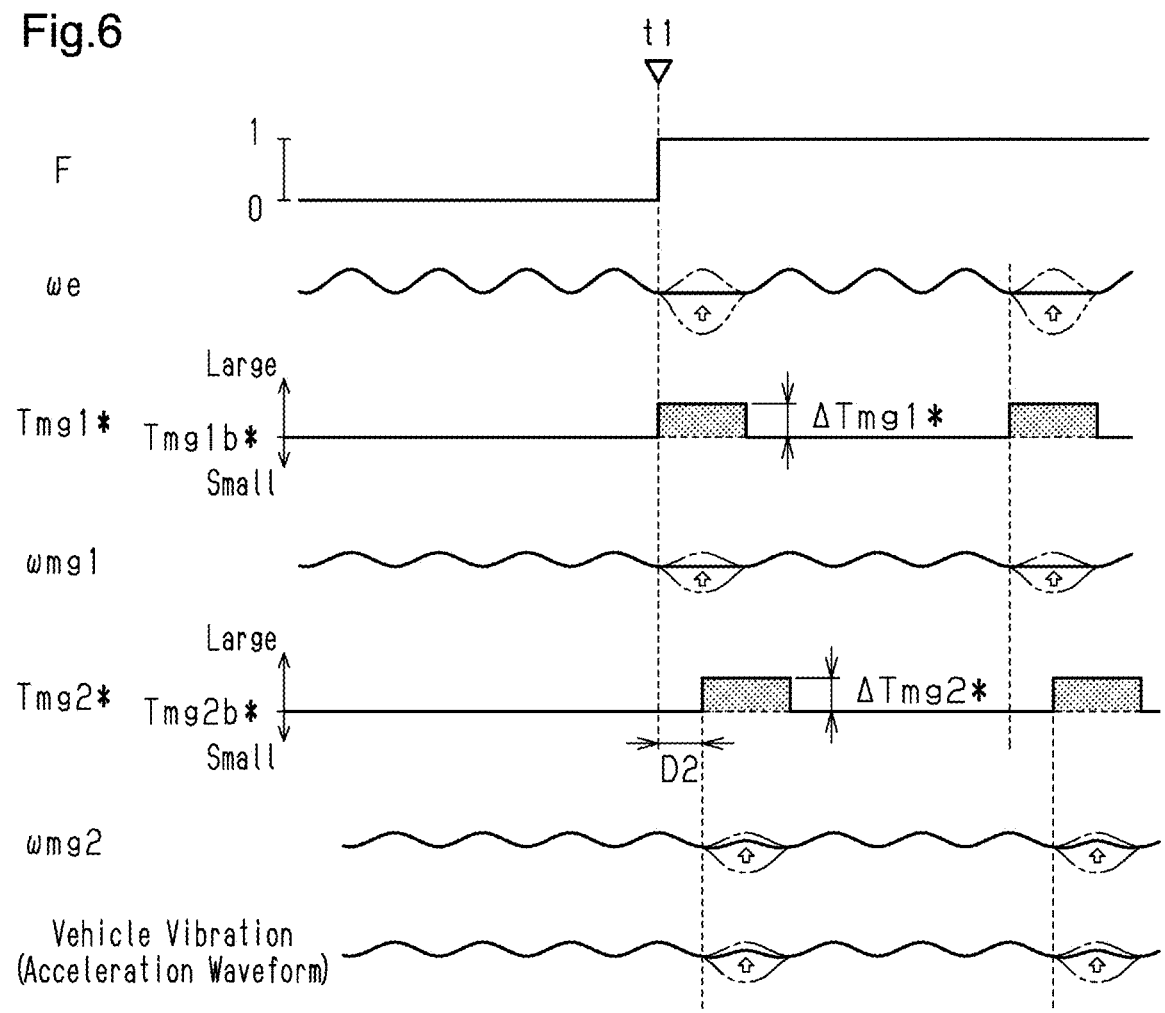
FIG. 6 is a timing diagram illustrating changes in the superimposed torques of the embodiment in FIG. 1.

FIG. 6 illustrates the processes that superimpose the first superimposed torque ΔTmg1* and the second superimposed torque ΔTmg2* in the present embodiment.

In FIG. 6, the alternate long and short dashed lines show examples of changes in an engine instantaneous speed ωe, a first instantaneous speed ωmg1, and a second instantaneous speed ωmg2 in a case where the regenerating process is not executed. Each of the alternate long and short dashed lines has a curved shape protruding upward from the horizontal portion shown by the corresponding solid line of the engine instantaneous speed ωe, the first instantaneous speed ωmg1, and the second instantaneous speed ωmg2 in FIG. 6. The engine instantaneous speed ωe is the rotation speed of the crankshaft 26 in relation to a rotation in an angular interval that is shorter than the occurrence interval of a compression top dead center. The engine rotation speed NE indicates the average speed of one or more rotations of the crankshaft 26. The first instantaneous speed ωmg1 is the rotation speed of the rotary shaft 52a of the first motor generator 52 in relation to a rotation in an angular interval that is shorter than the occurrence interval of a compression top dead center. The first instantaneous speed ωmg1 is also the rotation speed of the rotary shaft 52a of the first motor generator 52 in relation to a rotation in an angular interval that is shorter than the angular interval of a single rotation of the rotary shaft 52a of the first motor generator 52. The first rotation speed Nmg1 is the average speed of the rotary shaft 52a of the first motor generator 52 in relation to one or more rotations of the rotary shaft 52a. The second instantaneous speed ωmg2 is the rotation speed of the rotary shaft 54a of the second motor generator 54 in relation to a rotation in an angular interval that is shorter than the occurrence interval of a compression top dead center. The second instantaneous speed ωmg2 is also the rotation speed of the rotary shaft Ma of the second motor generator 54 in relation to a rotation in an angular interval that is lower than a single rotation of the rotary shaft 54a of the second motor generator 54. The second rotation speed Nmg2 is the average speed of the rotary shaft 54a of the second motor generator 54 in relation to one or more rotations of the rotary shaft 54a.

As shown by the long dashed double-short dashed line in FIG. 6 regarding the engine instantaneous speed ωe, when the regenerating process is executed and thus the processes of S38 to S48 are not executed, the engine instantaneous speed ωe cyclically decreases in synchronization with the compression top dead center of cylinder #1. Each of the long dashed double-short dashed line has a curved shape protruding downward from the horizontal portion shown by the corresponding solid line of the engine instantaneous speed ωe, the first instantaneous speed ωmg1, and the second instantaneous speed ωmg2 in FIG. 6. As shown by the long dashed double-short dashed line in FIG. 6 regarding the first instantaneous speed ωmg1, when the regenerating process is executed and thus the processes of S38 to S48 are not executed, the first instantaneous speed ωmg1 decreases after a delay from the decrease in the engine instantaneous speed ωe (the delay is too small to be understandable in FIG. 6). As shown by the long dashed double-short dashed line in FIG. 6 regarding the second instantaneous speed ωmg2, when the regenerating process is executed and thus the processes of S38 to S48 are not executed, the second instantaneous speed ωmg2 decreases after delays from the decrease in the engine instantaneous speed ωe and the decrease in the first instantaneous speed ωmg1.

The CPU 72 superimposes the first superimposed torque ΔTmg1* on the torque of the first motor generator 52. If the first superimposed torque ΔTmg1* is not superimposed on the torque of the first motor generator 52 and only the second superimposed torque ΔTmg2* is used, the first superimposed torque ΔTmg1* shown by the alternate long and short dashed line, for example, unavoidably decreases. Thus, the inventors have found that the vibration of the vehicle cannot be sufficiently limited in such a case.

The inventors have also found that the vibration of the vehicle can be sufficiently limited in the case of using the first superimposed torque ΔTmg1* and the second superimposed torque ΔTmg2* as compared with the case of using the first superimposed torque ΔTmg1* without using the second superimposed torque ΔTmg2*. Thus, the CPU 72 superimposes the second superimposed torque ΔTmg2* on the torque of the second motor generator 54.

FIG. 6 shows the point in time t1 where the compression top dead center of cylinder #1 occurs. In FIG. 6, the first superimposed torque ΔTmg1* is superimposed on the torque of the first motor generator 52 from the point in time t1. FIG. 6 also shows an example in which the second superimposed torque ΔTmg2* is superimposed on the torque of the second motor generator 54 at the point in time that is delayed with respect to the point in time t1 by the second delay amount D2. Starting the first superimposed torque ΔTmg1* from the point in time t1 is an example. In other words, the first delay amount D1 is not limited to zero. The first delay amount D1 indicates that the point in time of the superimposition of the first superimposed torque ΔTmg1* is delayed with respect to the point in time t1. In the present embodiment, the first delay amount D1 is smaller than the second delay amount D2. This is based on the fact that the decrease in the torque of the internal combustion engine 10 affects the first motor generator 52 at an earlier point in time than the second motor generator 54 as shown by the long dashed double-short dashed lines in the first instantaneous speed wmg1 and the second instantaneous speed ωmg2 in FIG. 6.

The above-described present embodiment further provides the following operation and advantage.

(1) The first superimposed torque ΔTmg1* and the second superimposed torque ΔTmg2* are superimposed in a cycle of an integral multiple of 180° CA in the internal combustion engine 10. 180° CA corresponds to a compression top dead center occurrence cycle during which the compression top dead center of the internal combustion engine 10 occurs. In this case, the integer of the integral multiple is four. That is, the first superimposed torque ΔTmg1* and the second superimposed torque ΔTmg2* are superimposed in a cycle of 720° CA, which is four times greater than 180° CA. For example, the square wave of the first superimposed torque ΔTmg1* occurs in a cycle of 720° CA. The process of S22 (the deactivating process for the deactivated cylinder #1) decreases the torque of the internal combustion engine 10. The decrease occurs in the occurrence cycle of the compression top dead center of cylinder #1. In other words, since the internal combustion engine 10 has four cylinders, the decrease in the torque of the internal combustion engine 10 resulting from the process of S22 occurs in a cycle which is four times greater than 180° CA (the compression top dead center occurrence cycle of the internal combustion engine 10). Accordingly, in the present embodiment, the first superimposed torque ΔTmg1* and the second superimposed torque ΔTmg2* are superimposed in a cycle of 720° CA (the occurrence cycle of the compression top dead center of cylinder #1). This allows for the decrease in the torque of the internal combustion engine 10 to be compensated for in a favorable manner.

Second Embodiment

A second embodiment will now be described with reference to FIGS. 7 to 9. The differences from the first embodiment will mainly be discussed.

In the first embodiment, the first superimposed torque ΔTmg1* and the second superimposed torque ΔTmg2* are used to compensate for the output decrease resulting from the deactivation of the combustion control in cylinder #1 (deactivated cylinder) over the period during which the regenerating process for the GPF 34 is executed. The present embodiment includes a process that increases the amount of combustion energy in cylinders #2 to #4 so as to compensate for the output decrease resulting from the deactivation of the combustion control in cylinder #1.

Figure 7:
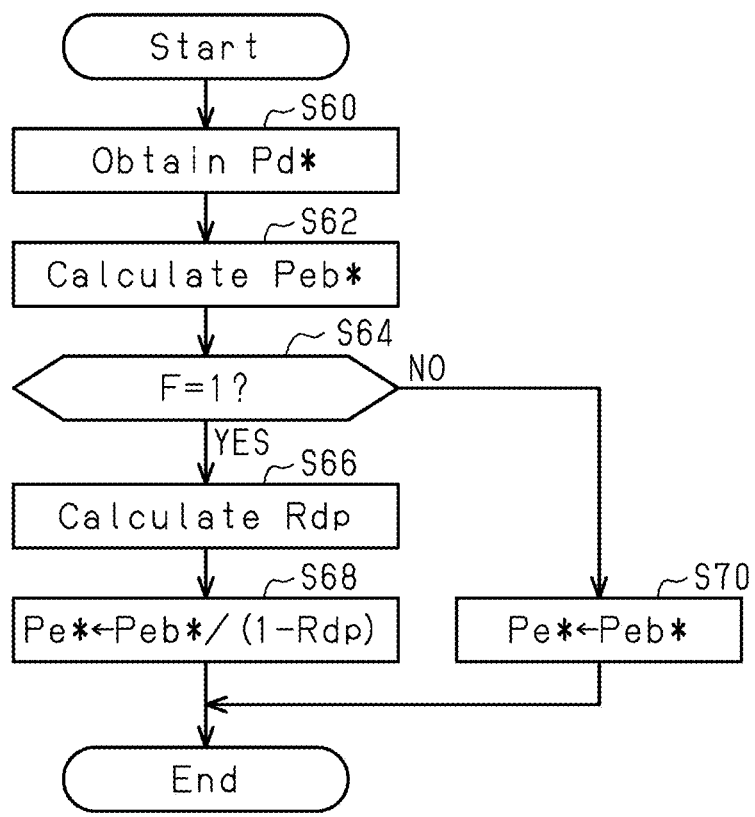
FIG. 7 is a flowchart illustrating a procedure of processes executed by the controller according to a second embodiment.

FIG. 7 shows a procedure of processes that increase the amount of the combustion energy in cylinders #2 to #4. The processes shown in FIG. 7 are executed by the CPU 72 repeatedly executing programs stored in the ROM 74, for example, in a specific cycle. These processes are included in the output distribution process M24, which is shown in FIG. 2.

In the series of processes shown in FIG. 7, the CPU 72 first obtains the requested output Pd* (S60). Then, the CPU 72 calculates an engine requested output base value Peb* (S62). The engine requested output base value Peb* satisfies the equation Peb*+Pmg1*+Pmg2*=Pd*. Subsequently, the CPU 72 determines whether the execution flag F is 1 (S64).

When determining that the execution flag F is 1 (S64: YES), the CPU 72 calculates a decrease ratio Rdp of the output of the internal combustion engine 10 (S66). In the present embodiment, since combustion control is deactivated only in cylinder #1 (deactivated cylinder) among cylinders #1 to #4, the decrease ratio Rdp is ¼. Then, the CPU 72 substitutes, into the engine requested output base value Peb*, the value obtained by dividing the engine requested output base value Peb* by 1−Rdp (S68).

When determining that the execution flag F is 0 (S64: NO), the CPU 72 substitutes the engine requested output base value Peb* into the engine requested output Pe* (S70).

When completing the process of step S68 or S70, the CPU 72 temporarily ends the series of processes shown in FIG. 7.

Figure 8:
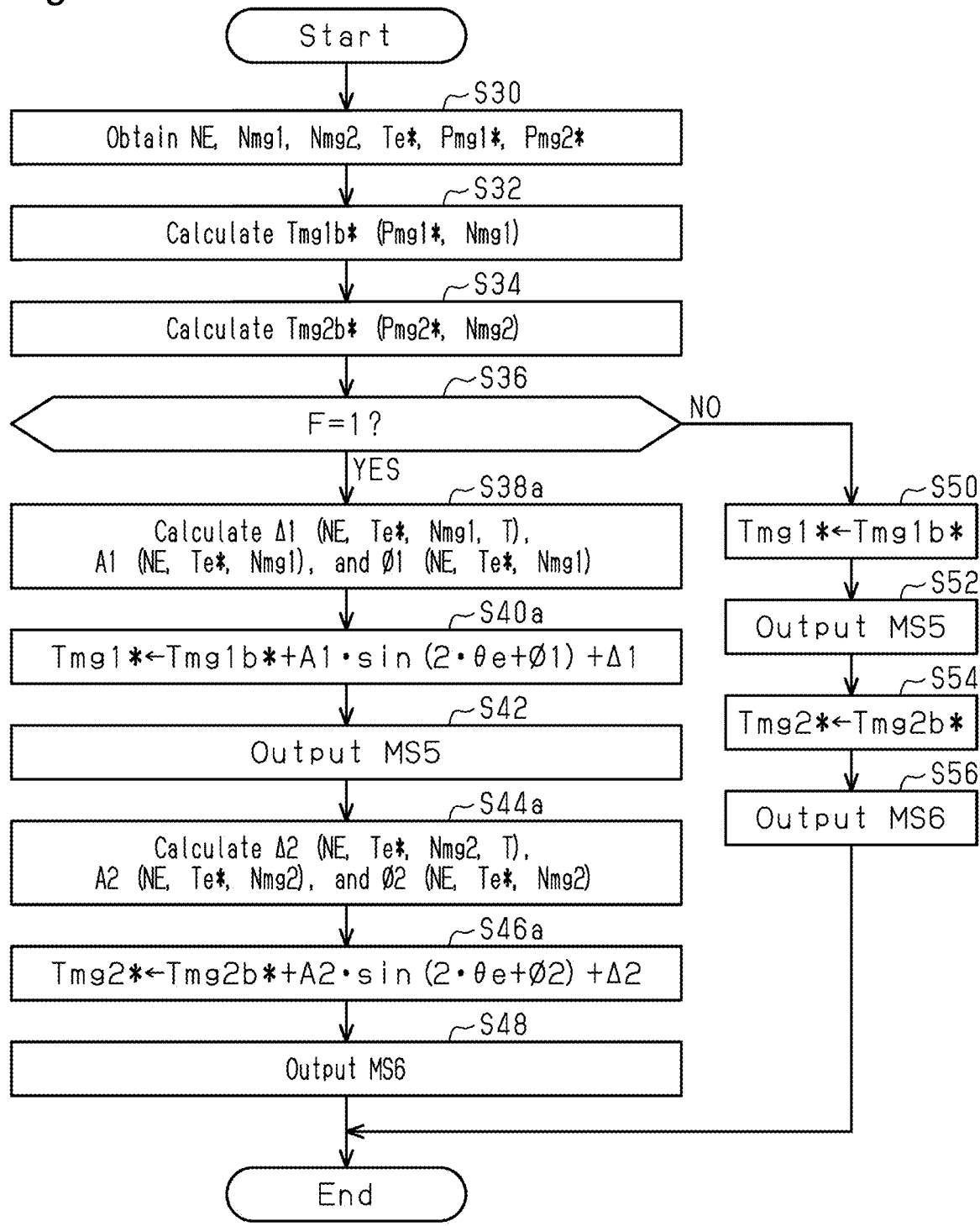
FIG. 8 is a flowchart illustrating a procedure of processes executed by the controller in the embodiment of FIG. 7.

FIG. 8 illustrates the processes that calculate the first superimposed torque ΔTmg1* and the second superimposed torque ΔTmg2*. The processes shown in FIG. 8 are executed by the CPU 72 repeatedly executing programs stored in the ROM 74, for example, in a specific cycle. In FIG. 8, the same step numbers are given to the processes that correspond to those in FIG. 4.

In the series of processes shown in FIG. 8, when determining that the execution flag F is 1 (S36: YES), the CPU 72 calculates a first offset amount Δ1, a first amplitude A1, and a first phase φ1 (S38a). In the present embodiment, the first superimposed torque ΔTmg1* is obtained by offsetting a sine wave having the first amplitude A1 by the first offset amount Δ1. The phase of the sine wave is the first phase φ1. The first superimposed torque ΔTmg1* is obtained as follows.

$$\Delta Tmg1^* = A1 \cdot \sin(2 \cdot \theta e + \varphi 1) + \Delta 1$$

This equation includes a crank angle θe. The crank angle θe is calculated by the CPU 72 in reference to the output signal Scr. In this equation, the first superimposed torque ΔTmg1* has a cycle of 180° CA. In other words, the first superimposed torque ΔTmg1* has a cycle that is one times the compression top dead center occurrence cycle. The compression top dead center occurrence cycle is a cycle during which the compression top dead center occurs in the internal combustion engine 10. In the present embodiment, since the internal combustion engine 10 has four cylinders, the compression top dead center occurrence cycle is 180° CA.

The CPU 72 variably sets the first amplitude A1 in correspondence with the engine rotation speed NE, the engine requested torque Te*, and the first rotation speed Nmg1. The CPU 72 sets the first amplitude A1 to be larger when the engine requested torque Te* is large than when the engine requested torque Te* is small. Further, the CPU 72 variably sets the first phase φ1 in correspondence with the engine rotation speed NE, the engine requested torque Te*, and the first rotation speed Nmg1. Furthermore, the CPU 72 variably sets the first offset amount Δ1 in correspondence with the engine rotation speed NE, the engine requested torque Te*, the first rotation speed Nmg1, and a duration T of the regenerating process. As the duration T of the regenerating process for the GPF 34 increases, the CPU 72 gradually decreases the first offset amount Δ1 to zero.

Subsequently, the CPU 72 substitutes, into the first requested torque Tmg1*, the value obtained by adding the first superimposed torque ΔTmg1* to the first requested torque base value Tmg1b* (S40a) and then proceeds to the process of S42. In S40a of FIG. 8, ΔTmg1* is equal to A1·sin (2·θe+φ1)+Δ1.

Then, the CPU 72 calculates a second offset amount Δ2, a second amplitude A2, and a second phase φ2 of the second superimposed torque ΔTmg2* (S44a). In the present embodiment, the second superimposed torque ΔTmg2* is obtained by offsetting a sine wave having the second amplitude A2 by the second offset amount Δ2. The phase of the sine wave of the second superimposed torque ΔTmg2* is the second phase φ2. The second superimposed torque ΔTmg2* is obtained as follows.

$$\Delta Tmg2^* = A2 \cdot \sin(2 \cdot \theta e + \varphi 2) + \Delta 2$$

In this equation, the second superimposed torque ΔTmg2* has a cycle of 180° CA. In other words, the second superimposed torque ΔTmg2* has the same cycle as the compression top dead center occurrence cycle of the internal combustion engine 10.

The CPU 72 variably sets the second amplitude A2 in correspondence with the engine rotation speed NE, the engine requested torque Te*, and the second rotation speed Nmg2. The CPU 72 sets the second amplitude A2 to be larger when the engine requested torque Te* is large than when the engine requested torque Te* is small. Further, the CPU 72 variably sets the second phase φ2 in correspondence with the engine rotation speed NE, the engine requested torque Te*, and the second rotation speed Nmg2. Furthermore, the CPU 72 variably sets the second offset amount Δ2 in correspondence with the engine rotation speed NE, the engine requested torque Te*, the second rotation speed Nmg2, and the duration T of the regenerating process. As the duration T increases, the CPU 72 gradually decreases the second offset amount Δ2 to zero.

Subsequently, the CPU 72 substitutes, into the second requested torque Tmg2*, the value obtained by adding the second superimposed torque ΔTmg2* to the second requested torque base value Tmg2b* (S46a) and proceeds to the process of S48.

In the present embodiment, each of the first superimposed torque ΔTmg1* and the second superimposed torque ΔTmg2* is obtained by adding the corresponding offset amount to torque having the shape of a sine wave. The average value of the torque having the shape of a sine wave is zero. Thus, the average value of the output resulting from the torque having the shape of a sine wave is zero. This indicates that the torque having the shape of a sine wave is appropriate when the process of S68 completely compensates for the decrease in the output of the internal combustion engine 10 resulting from the deactivation of combustion control in cylinder #1. However, even if the process of S68 is executed, the response delay resulting from the increase in the output of the internal combustion engine 10 results in delay by the time the output of the internal combustion engine 10 becomes the engine requested output Pe*. To solve this problem, the first offset amount Δ1 and the second offset amount Δ2 are used to compensate for the output deficiency of the internal combustion engine 10 resulting from the response delay. In other words, the first offset amount Δ1 and the second offset amount Δ2 are used to compensate for an amount that becomes deficient depending on the compensation amount of the process of S68 in the output deficiency of the internal combustion engine 10 resulting from the process of S22.

Section (a) of FIG. 9 shows changes in the engine instantaneous speed ωe, the first requested torque Tmg1*, and the second requested torque Tmg2* obtained prior to and subsequent to starting the regenerating process for the GPF 34. When the regenerating process is started at the point in time t1, the first requested torque Tmg1* becomes the value obtained by further superimposing a sine wave on the sum of the first requested torque base value Tmg1b* and the first offset amount 41. Further, the second requested torque Tmg2* becomes the value obtained by further superimposing a sine wave on the sum of the second requested torque base value Tmg2b* and the second offset amount 42.

At the point in time t1 in section (a) of FIG. 9, the compression top dead center of cylinder #1 (deactivated cylinder) occurs. The first delay amount D1 indicates that the point in time at which the first superimposed torque ΔTmg1* becomes the local maximum is delayed with respect to the point in time at which the compression top dead center of cylinder #1 occurs. The second delay amount D2 indicates that the point in time at which the second superimposed torque ΔTmg2* becomes the local maximum is delayed with respect to the point in time at which the compression top dead center of cylinder #1 occurs. As shown in section (a) of FIG. 9, the first delay amount D1 is smaller than the second delay amount D2. This is based on the fact that the decrease in the torque of the internal combustion engine 10 affects the first motor generator 52 at an earlier point in time than the second motor generator 54.

Section (b) of FIG. 9 shows the point in time at which the output of the internal combustion engine 10 follows the engine requested output Pe* that has been set through the process of S68 after the regenerating process was started. In this case, the first offset amount 41 and the second offset amount 42 become zero. Accordingly, the first requested torque Tmg1* is the value obtained by superimposing a sine wave on the first requested torque base value Tmg1b*. Further, the second requested torque Tmg2* is the value obtained by superimposing a sine wave on the second requested torque base value Tmg2b*.

Correspondence

The correspondence between the items in the above-described embodiments and the items described in the above-described SUMMARY is as follows. In the following description, the correspondence is shown for each of the numbers in the examples described in the SUMMARY.

[1], [2], [3] The first rotating electric machine corresponds to the first motor generator 52, and the second rotating electric machine corresponds to the second motor generator 54.

The deactivating process corresponds to the process of S22. The deactivated cylinder, that is, one or more of the cylinders in which combustion control is deactivated, corresponds to cylinder #1 in the above-described embodiments.

The first compensation process corresponds to the processes of S38 to S42 in FIG. 4 and the processes of S38a, S40a, S42 in FIG. 8. That is, the first compensation process (S38 to S42; S38a, S40a, S42) sets the torque of the first rotating electric machine (52) to be larger than the torque of the first rotating electric machine (52) obtained prior to starting the deactivating process (S22) so as to compensate for at least some of a decrease amount of the torque of the internal combustion engine (10) resulting from the deactivating process (S22).

The second compensation process corresponds to the processes of S44 to S48 in FIG. 4 and the processes of S44a, S46a, S48 in FIG. 8. That is, the second compensation process (S44 to S48; S44a, S46a, S48) sets the torque of the second rotating electric machine (54) to be larger than the torque of the second rotating electric machine (54) obtained prior to starting the deactivating process (S22) so as to compensate for at least some of the decrease amount of the torque of the internal combustion engine (10) resulting from the deactivating process (S22).

The first superimposed torque $\Delta Tmg1^*$ corresponds to the first output increase amount, that is, the increase amount of the output of the first rotating electric machine (52) resulting from an increase in the torque ($Tmg1^*$) of the first rotating electric machine (52) obtained by the first compensation process (S38 to S42; S38a, S40a, S42).

The second superimposed torque $\Delta Tmg2^*$ corresponds to the second output increase amount, that is, the increase amount of the output of the second rotating electric machine (54) resulting from an increase in the torque ($Tmg2^*$) of the second rotating electric machine (54) caused by the second compensation process (S44 to S48; S44a, S46a, S48).

[4] The integer of the integral multiple of the compression top dead center occurrence cycle corresponds to four in FIG. 6 and corresponds to one in FIG. 9.

[5] The energy increasing process corresponds to the process of S68 in FIG. 7. The given time corresponds to the time of a single combustion cycle.

[6], [7] The first delay amount corresponds to the first delay amount D1, and the second delay amount corresponds to the second delay amount D2.

[8] In the process of S38a in FIG. 8, this aspect corresponds to setting the first amplitude A1 in correspondence with the engine requested torque Te*.

[9] This aspect corresponds to FIG. 5.

[10] The first rotating electric machine corresponds to the first motor generator 52, and the second rotating electric machine corresponds to the second motor generator 54.

The deactivating process corresponds to the process of S22.

The first fluctuation process corresponds to the processes of S38 to S42 in FIG. 4 and the processes of S38a, S40a, S42 in FIG. 8.

The second fluctuation process corresponds to the processes of S44 to S48 in FIG. 4 and the processes of S44a, S46a, S48 in FIG. 8.

Modifications

The present embodiment may be modified as follows. The above-described embodiment and the following modifications can be combined as long as the combined modifications remain technically consistent with each other.

Modification Related to First Compensation Process and First Fluctuation Process In S38 of FIG. 4 of the first embodiment, the magnitude and waveform of the first superimposed torque $\Delta Tmg1^*$ are variably set in correspondence with the engine rotation speed NE, the engine requested torque Te*, and the first rotation speed Nmg1. Instead, for example, when the engine rotation speed NE used to execute the regenerating process is limited to a narrow range, the magnitude and waveform of the first superimposed torque $\Delta Tmg1^*$ may be variably set in correspondence with only the engine requested torque Te* and the first rotation speed Nmg1. In the case of limiting the first rotation speed Nmg1 at the moment to a narrow range, the magnitude and waveform of the first superimposed torque $\Delta Tmg1^*$ may be variably set in correspondence with only the engine requested torque Te*.

The magnitude and waveform of the first superimposed torque $\Delta Tmg1^*$ do not have to be variably set in correspondence with the engine rotation speed NE, the engine requested torque Te*, and the first rotation speed Nmg1. Instead, for example, the magnitude and waveform of the first superimposed torque $\Delta Tmg1^*$ may be variably set in correspondence with the engine requested output Pe*, the engine rotation speed NE, and the first rotation speed Nmg1. The engine requested torque Te* may be represented by a pair of variables, namely, the engine requested output Pe* and the engine rotation speed NE. Thus, in the case of defining the first superimposed torque $\Delta Tmg1^*$ using the engine requested output Pe* and the engine rotation speed NE as inputs, the first superimposed torque $\Delta Tmg1^*$ may be set to be larger when the engine requested torque Te* is large than when the engine requested torque Te* is small.

In the process of FIG. 4, the magnitude, waveform, and phase of the first superimposed torque $\Delta Tmg1^*$ are variably set in correspondence with the same variables. However, this configuration does not have to be employed.

The method for variably setting the waveform of the first superimposed torque $\Delta Tmg1^*$ is not limited to the process that varies the pulse waveform as illustrated in FIG. 5. Instead, for example, a process may be executed to switch between the square pulse illustrated in section (a) of FIG. 5 and the sine waveform illustrated in FIG. 9.

Even in a case where the waveform of the first superimposed torque $\Delta Tmg1^*$ is a pulse waveform, the waveform does not have to be variably set. For example, only the shape illustrated in section (b) of FIG. 5 may be used as a pulse waveform.

In S38a of FIG. 8, the first offset amount $\Delta 1$ is variably set in correspondence with the engine rotation speed NE, the engine requested torque Te*, and the first rotation speed Nmg1. Instead, for example, when the engine rotation speed NE used to execute the regenerating process is limited to a narrow range, the first offset amount $\Delta 1$ may be variably set in correspondence with only the engine requested torque Te* and the first rotation speed Nmg1 of these three variables. In the case of limiting the first rotation speed Nmg1 at the moment to a narrow range, the first offset amount $\Delta 1$ may be variably set in correspondence with only the engine requested torque Te* of these three variables.

Additionally, in S38a of FIG. 8, the first offset amount $\Delta 1$ does not have to be variably set in correspondence with only some of the engine rotation speed NE, the engine requested torque Te*, and the first rotation speed Nmg1 other than the duration T of the regenerating process for the GPF 34. Instead, for example, the first offset amount $\Delta 1$ may be variably set in correspondence with the engine requested output Pe*, the engine rotation speed NE, and the first rotation speed Nmg1.

In S38a of FIG. 8, in the process that gradually decreases the first offset amount Δ1 to zero, the duration T does not have to be used as an input. For example, an actual output of the internal combustion engine 10 obtained from the intake air amount Ga may be treated as an input of the process that gradually decreases the first offset amount Δ1 to zero.

The processes in FIG. 8 may be employed in a case where the processes of S64 to S68 in FIG. 7 are not executed. In this case, the first offset amount Δ1 simply needs to be set such that the first offset amount Δ1 does not decrease in correspondence with the duration T.

In S38a of FIG. 8, the first amplitude A1 and the first phase φ1 are variably set in correspondence with the engine rotation speed NE, the engine requested torque Te*, and the first rotation speed Nmg1. Instead, for example, when the engine rotation speed NE used to execute the regenerating process is limited to a narrow range, the first amplitude A1 and the first phase φ1 may be variably set in correspondence with only the engine requested torque Te* and the first rotation speed Nmg1. In the case of limiting the first rotation speed Nmg1 at the moment to a narrow range, the first amplitude A1 and the first phase φ1 may be variably set in correspondence with only the engine requested torque Te*.

Additionally, the first amplitude A1 and the first phase φ1 do not have to be variably set in correspondence with only some of the engine rotation speed NE, the engine requested torque Te*, and the first rotation speed Nmg1. Instead, for example, the first amplitude A1 and the first phase φ1 may be variably set in correspondence with the engine requested output Pe*, the engine rotation speed NE, and the first rotation speed Nmg1. The engine requested torque Te* may be represented by a pair of variables, namely, the engine requested output Pe* and the engine rotation speed NE. Thus, in the case of defining the first amplitude A1 using the engine requested output Pe* and the engine rotation speed NE as inputs, the first amplitude A1 may be set to be larger when the engine requested torque Te* is large than when the engine requested torque Te* is small.

In FIG. 8, except for the duration T, the same input variables (engine rotation speed NE, engine requested torque Te*, and first rotation speed Nmg1) are used to variably set the first offset amount Δ1, the first amplitude A1, and the first phase φ1. However, the same variables do not have to be used in this manner Modification Related to Second Compensation Process and Second Fluctuation Process In S44 of FIG. 4 of the first embodiment, the magnitude and waveform of the second superimposed torque ΔTmg2* are variably set in correspondence with the engine rotation speed NE, the engine requested torque Te*, and the second rotation speed Nmg2. Instead, for example, when the engine rotation speed NE used to execute the regenerating process is limited to a narrow range, the magnitude and waveform of the second superimposed torque ΔTmg2* may be variably set in correspondence with only the engine requested torque Te* and the second rotation speed Nmg2. In the case of limiting the second rotation speed Nmg2 at the moment to a narrow range, the magnitude and waveform of the second superimposed torque ΔTmg2* may be variably set in correspondence with only the engine requested torque Te*.

The magnitude and waveform of the second superimposed torque ΔTmg2* do not have to be variably set in correspondence with the engine rotation speed NE, the engine requested torque Te*, and the second rotation speed Nmg2. Instead, for example, the magnitude and waveform of the second superimposed torque ΔTmg2* may be variably set in correspondence with the engine requested output Pe*, the engine rotation speed NE, and the second rotation speed Nmg2. The engine requested torque Te* may be represented by a pair of variables, namely, the engine requested output Pe* and the engine rotation speed NE. Thus, in the case of defining the second superimposed torque ΔTmg2* using the engine requested output Pe* and the engine rotation speed NE as inputs, the second superimposed torque ΔTmg2* may be set to be larger when the engine requested torque Te* is large than when the engine requested torque Te* is small.

In the process of FIG. 4, the magnitude, waveform, and phase of the second superimposed torque ΔTmg2* are variably set in correspondence with the same variables. However, this configuration does not have to be employed.

The method for variably setting the waveform of the second superimposed torque ΔTmg2* is not limited to the process that varies the pulse waveform as illustrated in FIG. 5. Instead, for example, a process may be executed to switch between the square pulse illustrated in section (a) of FIG. 5 and the sine waveform illustrated in FIG. 9.

Even in a case where the waveform of the second superimposed torque ΔTmg2* is a pulse waveform, the waveform does not have to be variably set. For example, only the shape illustrated in section (b) of FIG. 5 may be used as a pulse waveform.

In FIG. 8, the second offset amount 42 is variably set in correspondence with the engine rotation speed NE, the engine requested torque Te*, and the second rotation speed Nmg2. Instead, for example, when the engine rotation speed NE used to execute the regenerating process is limited to a narrow range, the second offset amount 42 may be variably set in correspondence with only the engine requested torque Te* and the second rotation speed Nmg2 of these three variables. In the case of limiting the second rotation speed Nmg2 at the moment to a narrow range, the second offset amount 42 may be variably set in correspondence with only the engine requested torque Te* of these three variables.

Additionally, the second offset amount 42 does not have to be variably set in correspondence with only some of the engine rotation speed NE, the engine requested torque Te*, and the second rotation speed Nmg2 other than the duration T. Instead, for example, the second offset amount 42 may be variably set in correspondence with the engine requested output Pe*, the engine rotation speed NE, and the second rotation speed Nmg2.

In the process that gradually decreases the second offset amount 42 to zero, the duration T does not have to be used as an input. For example, an actual output of the internal combustion engine 10 obtained from the intake air amount Ga may be treated as an input of the process that gradually decreases the second offset amount 42 to zero.

The processes in FIG. 8 may be employed in a case where the processes of S64 to S68 in FIG. 7 are not executed. In this case, the second offset amount 42 simply needs to be set such that the second offset amount 42 does not decrease in correspondence with the duration T.

In FIG. 8, the second amplitude A2 and the second phase φ2 are variably set in correspondence with the engine rotation speed NE, the engine requested torque Te*, and the second rotation speed Nmg2. Instead, for example, when the engine rotation speed NE used to execute the regenerating process is limited to a narrow range, the second amplitude A2 and the second phase φ2 may be variably set in correspondence with only the engine requested torque Te* and the second rotation speed Nmg2. In the case of limiting the second rotation speed Nmg2 at the moment to a narrow range, the second amplitude A2 and the second phase φ2 may be variably set in correspondence with only the engine requested torque Te*.

Additionally, the second amplitude A2 and the second phase φ2 do not have to be variably set in correspondence with only some of the engine rotation speed NE, the engine requested torque Te*, and the second rotation speed Nmg2. Instead, for example, the second amplitude A2 and the second phase φ2 may be variably set in correspondence with the engine requested output Pe*, the engine rotation speed NE, and the second rotation speed Nmg2. The engine requested torque Te* may be represented by a pair of variables, namely, the engine requested output Pe* and the engine rotation speed NE. Thus, in the case of defining the second amplitude A2 using the engine requested output Pe* and the engine rotation speed NE as inputs, the second amplitude A2 may be set to be larger when the engine requested torque Te* is large than when the engine requested torque Te* is small.

In FIG. 8, except for the duration T, the same input variables (engine rotation speed NE, engine requested torque Te*, and second rotation speed Nmg2) are used to variably set the second offset amount 42, the second amplitude A2, and the second phase φ2. However, the same variables do not have to be used in this manner Relationship Between First Superimposed Torque and Second Superimposed Torque The first superimposed torque and the second superimposed torque do not have to be used to compensate for the torque used to compensate for at least some of the decrease amount of the output of the internal combustion engine 10 resulting from the regenerating process. Instead, for example, only the first superimposed torque may be used to compensate for at least some of the decrease amount of the output of the internal combustion engine 10 resulting from the regenerating process. This can be executed by, for example, setting the second offset amount 42 to zero in the process of FIG. 8. Additionally, for example, in the process of FIG. 8, there may be a period during which the first superimposed torque ΔTmg1* is solely used to compensate in a temporal manner for the amount of the decrease output of the internal combustion engine 10 resulting from the regenerating process. In this case, the compensation is made by advancing the point in time at which the second offset amount 42 becomes zero with respect to the point in time at which the first offset amount 41 becomes zero.

In FIG. 5, the waveforms of the first superimposed torque ΔTmg1* and the second superimposed torque ΔTmg2* have the same shape when variably set. Instead, for example, while the first superimposed torque ΔTmg1* has a trapezoidal shape as illustrated in section (b) of FIG. 5, the second superimposed torque ΔTmg2* may have a square shape as illustrated in section (a) of FIG. 5.

In FIGS. 6 and 9, the second delay amount D2 is greater than the first delay amount D1. Instead, the first delay amount D1 may be greater than or equal to the second delay amount D2 in, for example, the following case. That is, the magnitude relationship of the phase delay decrease amounts of the first rotation speed Nmg1 and the second rotation speed Nmg2 resulting from the deactivation of combustion control is reversed by changing the manner of connecting the power split device to the vehicle on-board prime mover or by changing members as described below in the Modification Related to Vehicle.

The first superimposed torque ΔTmg1* does not have to be used as a calculation parameter. For example, the first requested torque Tmg1* may be directly calculated instead of calculating the first superimposed torque ΔTmg1* in reference to the variables that are used in the processes of S38 and S38a.

The second superimposed torque ΔTmg2* does not have to be used as a calculation parameter. For example, the second requested torque Tmg2* may be directly calculated instead of calculating the second superimposed torque ΔTmg2* in reference to the variables that are used in the processes of S44 and S44a.

Modification Related to Energy Increasing Process

The process that increases the combustion energy amount in a cylinder that is not subject to combustion deactivation through the regeneration process (i.e., a cylinder other than the deactivated cylinder) in order to limit a decrease in the average output per combustion cycle of the internal combustion engine 10 caused by the regeneration process is not limited to the process that increases the charging efficiency. For example, a process may be executed to cause the ignition timing to approach a minimum advance for the best torque (MBT).

Modification Related to Deactivating Process

The deactivating process for combustion control in the deactivated cylinder is not limited to the regenerating process for the GPF 34. Instead, for example, a process may be executed to deactivate the supply of fuel in the deactivated cylinder (one or more of the cylinders) in order to adjust the output of the internal combustion engine 10. Alternatively, when an anomaly occurs in the deactivated cylinder, a process may be executed to deactivate combustion control in the cylinder where the anomaly occurs. As another option, when the oxygen absorption amount of the three-way catalyst 32 is less than or equal to a given value, the deactivating process may be executed to deactivate combustion control only in the deactivated cylinder in order to supply oxygen to the three-way catalyst 32 and control the air-fuel ratio of air-fuel mixture in the remaining cylinders to the stoichiometric air-fuel ratio.

Modification Related to Estimation of Deposition Amount

The process that estimates the deposition amount DPM of the GPF 34 is not limited to the one illustrated in FIG. 3. Instead, for example, the deposition amount DPM may be estimated using the intake air amount Ga and the pressure difference between the upstream side and the downstream side of the GPF 34. More specifically, the deposition amount DPM is estimated to be a larger value when the pressure difference is large than when the pressure difference is small Even when the pressure difference is the same, the deposition amount DPM simply needs to be estimated to be a larger value when the intake air amount Ga is small than when the intake air amount Ga is large. If the pressure in the downstream side of the GPF 34 is regarded as a fixed value, the deposition amount DPM may be estimated using the pressure Pex instead of the pressure difference.

Modification Related to Aftertreatment Device

Further, the GPF 34 does not have to be located on the downstream side of the three-way catalyst 32 in the exhaust passage 30. Furthermore, the aftertreatment device does not necessarily have to include the GPF 34. The GPF 34 is not limited to a filter that supports a three-way catalyst. For example, when a three-way catalyst is provided upstream of the GPF 34, the GPF 34 may only include a filter.

Modification Related to Controller

The controller is not limited to a device that includes the CPU 72 and the ROM 74 and executes software processing.

For example, at least part of the processes executed by the software in the above-described embodiments may be executed by hardware circuits dedicated to executing these processes (such as ASIC). That is, the controller may be modified as long as it has any one of the following configurations (a) to (c): (a) a configuration including a processor that executes all of the above-described processes according to programs and a program storage device such as a ROM (including a non-transitory computer readable memory medium) that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software execution devices each including a processor and a program storage device and a plurality of dedicated hardware circuits may be provided.

Modification Related to Power Split Device

The power split device is not limited to a planetary gear mechanism.

Modification Related to Vehicle

The planetary gear mechanism does not need to be connected to the vehicle on-board prime mover in the manner illustrated in FIG. 1. Instead, the second motor generator 54 and the driven wheels 60 may be mechanically connected to the sun gear S, and the first motor generator 52 may be mechanically connected to the ring gear R.

In this specification, "at least one of A and B" should be understood to mean "only A, only B, or both A and B."

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle, the controller being employed in the hybrid electric vehicle that includes an internal combustion engine, a first rotating electric machine, a second rotating electric machine, a driven wheel, and a power split device, wherein
   the internal combustion engine and the first rotating electric machine are capable of applying power to the driven wheel via the power split device,
   the second rotating electric machine is capable of applying power to the driven wheel without going through the power split device,
   the internal combustion engine includes cylinders,
   the controller is configured to execute:
      a deactivating process that deactivates combustion control in a deactivated cylinder, the deactivated cylinder corresponding to one or more of the cylinders of the internal combustion engine;
      a first compensation process that sets, when the deactivating process is executed, torque of the first rotating electric machine to be larger than torque of the first rotating electric machine obtained prior to starting the deactivating process so as to compensate for at least some of a decrease amount of torque of the internal combustion engine resulting from the deactivating process; and
      a second compensation process that sets, when the deactivating process is executed, torque of the second rotating electric machine to be larger than torque of the second rotating electric machine obtained prior to starting the deactivating process so as to compensate for at least some of the decrease amount of the torque of the internal combustion engine resulting from the deactivating process,
   a compression top dead center occurrence cycle indicates a cycle during which a compression top dead center occurs in the internal combustion engine,
   the first compensation process cyclically fluctuates the torque of the first rotating electric machine in a cycle of an integral multiple of the compression top dead center occurrence cycle,
   the second compensation process cyclically fluctuates the torque of the second rotating electric machine in a cycle of an integral multiple of the compression top dead center occurrence cycle,
   the controller is configured to execute an energy increasing process that increases a combustion energy amount of a cylinder that differs from the deactivated cylinder of the internal combustion engine so as to compensate for the decrease in an output of the internal combustion engine resulting from the deactivating process,
   the first compensation process includes a process that cyclically fluctuates, when the deactivating process is executed, an average value of an increase amount of an output of the first rotating electric machine resulting from the increase in the torque of the first rotating electric machine in a given time even after decreasing the average value to zero from a value greater than zero, and
   the second compensation process includes a process that cyclically fluctuates, when the deactivating process is executed, an average value of an increase amount of an output of the second rotating electric machine resulting from the increase in the torque of the second rotating electric machine in the given time even after decreasing the average value to zero from a value greater than zero.

2. The controller for the hybrid electric vehicle according to claim 1, wherein
   a first output increase amount is an increase amount of an output of the first rotating electric machine resulting from an increase in the torque of the first rotating electric machine obtained by the first compensation process,
   a second output increase amount is an increase amount of an output of the second rotating electric machine resulting from an increase in the torque of the second rotating electric machine obtained by the second compensation process, and
   the controller is configured to execute the first compensation process and the second compensation process such that an average value of a sum of the first output increase amount and the second output increase amount in a given time becomes equal to the decrease amount of an output of the internal combustion engine resulting from the deactivating process in the given time.

3. A controller for a hybrid electric vehicle, the controller being employed in the hybrid electric vehicle that includes an internal combustion engine, a first rotating electric machine, a second rotating electric machine, a driven wheel, and a power split device, wherein
- the internal combustion engine and the first rotating electric machine are capable of applying power to the driven wheel via the power split device,
- the second rotating electric machine is capable of applying power to the driven wheel without going through the power split device,
- the internal combustion engine includes cylinders,
- the controller is configured to execute:
  - a deactivating process that deactivates combustion control in a deactivated cylinder, the deactivated cylinder corresponding to one or more of the cylinders of the internal combustion engine;
  - a first compensation process that sets, when the deactivating process is executed, torque of the first rotating electric machine to be larger than torque of the first rotating electric machine obtained prior to starting the deactivating process so as to compensate for at least some of a decrease amount of torque of the internal combustion engine resulting from the deactivating process; and
  - a second compensation process that sets, when the deactivating process is executed, torque of the second rotating electric machine to be larger than torque of the second rotating electric machine obtained prior to starting the deactivating process so as to compensate for at least some of the decrease amount of the torque of the internal combustion engine resulting from the deactivating process,
- a compression top dead center occurrence cycle indicates a cycle during which a compression top dead center occurs in the internal combustion engine,
- the first compensation process cyclically fluctuates the torque of the first rotating electric machine in a cycle of an integral multiple of the compression top dead center occurrence cycle,
- the second compensation process cyclically fluctuates the torque of the second rotating electric machine in a cycle of an integral multiple of the compression top dead center occurrence cycle,
- the torque of the first rotating electric machine includes a local maximum, a point in time of the local maximum of the first rotating electric machine is delayed with respect to the compression top dead center of the deactivated cylinder subject to the deactivating process by a first delay amount,
- the torque of the second rotating electric machine includes a local maximum, a point in time of the local maximum of the second rotating electric machine is delayed with respect to the compression top dead center of the deactivated cylinder subject to the deactivating process by a second delay amount,
- the local maxima are extrema where positive torque is applied to the driven wheel, and
- the second delay amount is set to be different from the first delay amount.

4. The controller for the hybrid electric vehicle according to claim 3, wherein the second delay amount is set to be greater than the first delay amount.

5. A controller for a hybrid electric vehicle, the controller being employed in the hybrid electric vehicle that includes an internal combustion engine, a first rotating electric machine, a second rotating electric machine, a driven wheel, and a power split device, wherein
- the internal combustion engine and the first rotating electric machine are capable of applying power to the driven wheel via the power split device,
- the second rotating electric machine is capable of applying power to the driven wheel without going through the power split device,
- the internal combustion engine includes cylinders,
- the controller is configured to execute:
  - a deactivating process that deactivates combustion control in a deactivated cylinder, the deactivated cylinder corresponding to one or more of the cylinders of the internal combustion engine;
  - a first compensation process that sets, when the deactivating process is executed, torque of the first rotating electric machine to be larger than torque of the first rotating electric machine obtained prior to starting the deactivating process so as to compensate for at least some of a decrease amount of torque of the internal combustion engine resulting from the deactivating process; and
  - a second compensation process that sets, when the deactivating process is executed, torque of the second rotating electric machine to be larger than torque of the second rotating electric machine obtained prior to starting the deactivating process so as to compensate for at least some of the decrease amount of the torque of the internal combustion engine resulting from the deactivating process,
- a compression top dead center occurrence cycle indicates a cycle during which a compression top dead center occurs in the internal combustion engine,
- the first compensation process cyclically fluctuates the torque of the first rotating electric machine in a cycle of an integral multiple of the compression top dead center occurrence cycle,
- the second compensation process cyclically fluctuates the torque of the second rotating electric machine in a cycle of an integral multiple of the compression top dead center occurrence cycle,
- a cyclic fluctuation amount of the torque of the first rotating electric machine is represented by an amplitude of the torque of the first rotating electric machine, and
- the first compensation process includes a process that sets the amplitude of the torque of the first rotating electric machine to be larger when an engine requested torque for the internal combustion engine is large than when the engine requested torque is small.

6. A controller for a hybrid electric vehicle, the controller being employed in the hybrid electric vehicle that includes an internal combustion engine, a first rotating electric machine, a second rotating electric machine, a driven wheel, and a power split device, wherein
- the internal combustion engine and the first rotating electric machine are capable of applying power to the driven wheel via the power split device,
- the second rotating electric machine is capable of applying power to the driven wheel without going through the power split device,
- the internal combustion engine includes cylinders,
- the controller is configured to execute:
  - a deactivating process that deactivates combustion control in a deactivated cylinder, the deactivated cylinder corresponding to one or more of the cylinders of the internal combustion engine;
  - a first compensation process that sets, when the deactivating process is executed, torque of the first rotating electric machine to be larger than torque of the first rotating electric machine obtained prior to starting the deactivating process so as to compensate for at least some of a decrease amount of torque of the internal combustion engine resulting from the deactivating process; and a second compensation process that sets, when the deactivating process is executed, torque of the second rotating electric machine to be larger than torque of the second rotating electric machine obtained prior to starting the deactivating process so as to compensate for at least some of the decrease amount of the torque of the internal combustion engine resulting from the deactivating process, a compression top dead center occurrence cycle indicates a cycle during which a compression top dead center occurs in the internal combustion engine, the first compensation process cyclically fluctuates the torque of the first rotating electric machine in a cycle of an integral multiple of the compression top dead center occurrence cycle, the second compensation process cyclically fluctuates the torque of the second rotating electric machine in a cycle of an integral multiple of the compression top dead center occurrence cycle, and the first compensation process includes a process that changes a waveform of the torque of the first rotating electric machine while setting a cycle of the torque of the first rotating electric machine to an integral multiple of the compression top dead center occurrence cycle in the internal combustion engine.

\* \* \* \* \*